(12) United States Patent
Van Den Goor

(10) Patent No.: US 6,910,567 B2
(45) Date of Patent: Jun. 28, 2005

(54) CONVEYOR SYSTEM WITH PUSH SHOES MOVEABLE ALONGSIDE THE SUPPORTS

(75) Inventor: Jacobus Marie Van Den Goor, Nuenen (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

(21) Appl. No.: 10/457,587

(22) Filed: Jun. 10, 2003

(65) Prior Publication Data

US 2004/0089513 A1 May 13, 2004

(30) Foreign Application Priority Data

Jun. 11, 2002 (NL) .............................................. 1020825

(51) Int. Cl.[7] ........................ B65G 47/10; B65G 47/46; B65G 17/06; B65G 17/38
(52) U.S. Cl. ............................ 198/370.02; 198/370.03; 198/853
(58) Field of Search ....................... 198/370.02, 370.03, 198/851, 853

(56) References Cited

U.S. PATENT DOCUMENTS

| | | |
|---|---|---|
| 5,127,510 A | 7/1992 | Cotter et al. |
| 5,191,959 A | 3/1993 | Leemkuil |
| 5,613,591 A * | 3/1997 | Heit et al. ............. 198/370.02 |
| 5,826,695 A | 10/1998 | Van Den Goor |
| 5,909,797 A * | 6/1999 | Van Den Goor ....... 198/370.02 |
| 6,283,271 B1 | 9/2001 | Van Den Goor |

FOREIGN PATENT DOCUMENTS

| | | |
|---|---|---|
| EP | 0 602 694 | 6/1994 |
| EP | 0 782 966 | 7/1997 |
| FR | 2 388 737 | 11/1978 |
| WO | WO 00/41956 | 7/2000 |

* cited by examiner

Primary Examiner—Gene O. Crawford
(74) Attorney, Agent, or Firm—Oblon, Spivak, McClelland, Maier & Neustadt, P.C.

(57) ABSTRACT

A conveyor system including at least one support, each support having on a top side a mainly flat bearing surface extending between the support's front longitudinal top edge and back longitudinal top edge, at least one push shoe, each push shoe supported by one of the at least one support, each push shoe including, a guiding unit extending under the level of the bearing surface, a pushing unit extending above the level of the bearing surface and connected to the guiding unit.

53 Claims, 33 Drawing Sheets

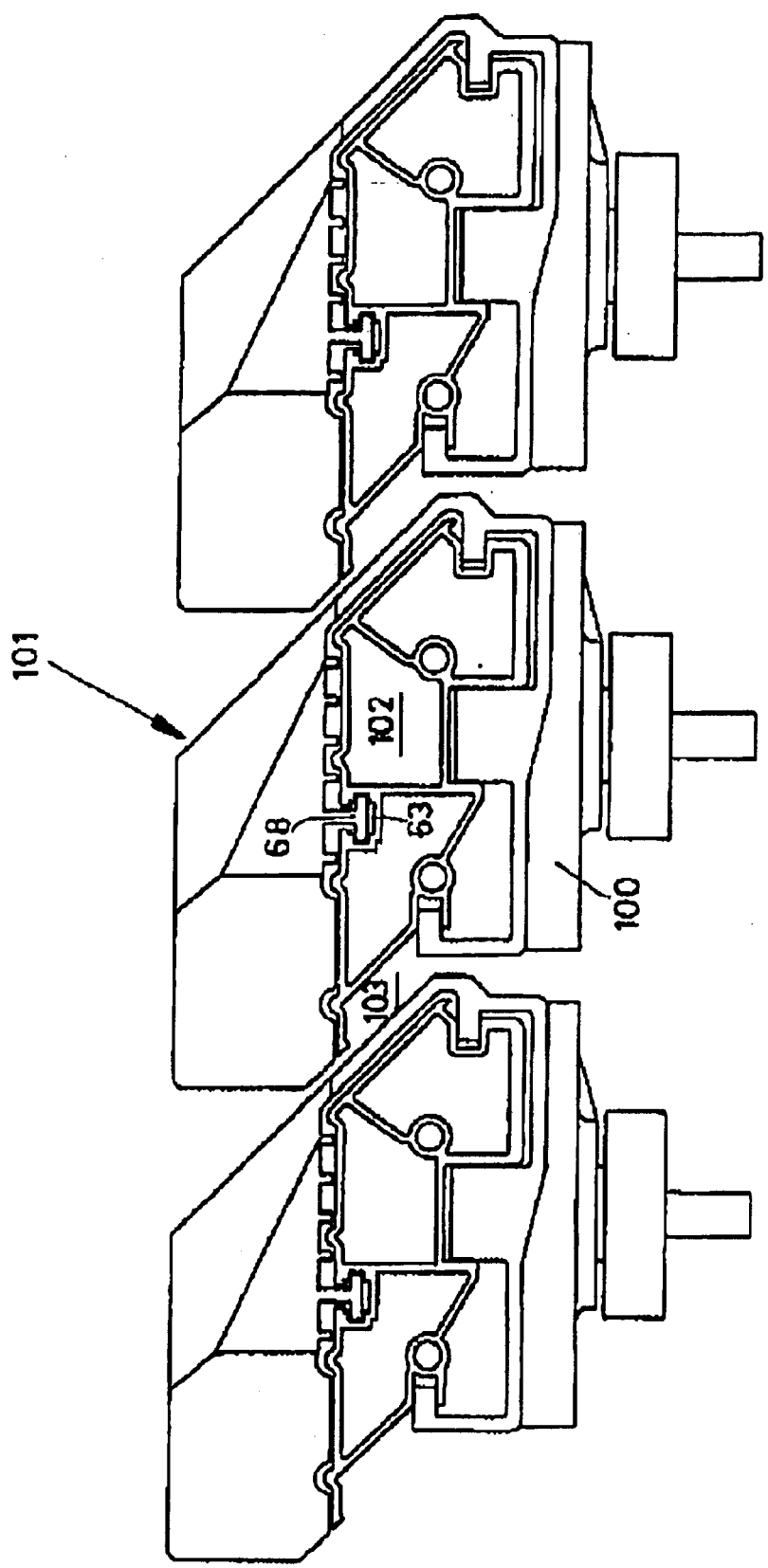

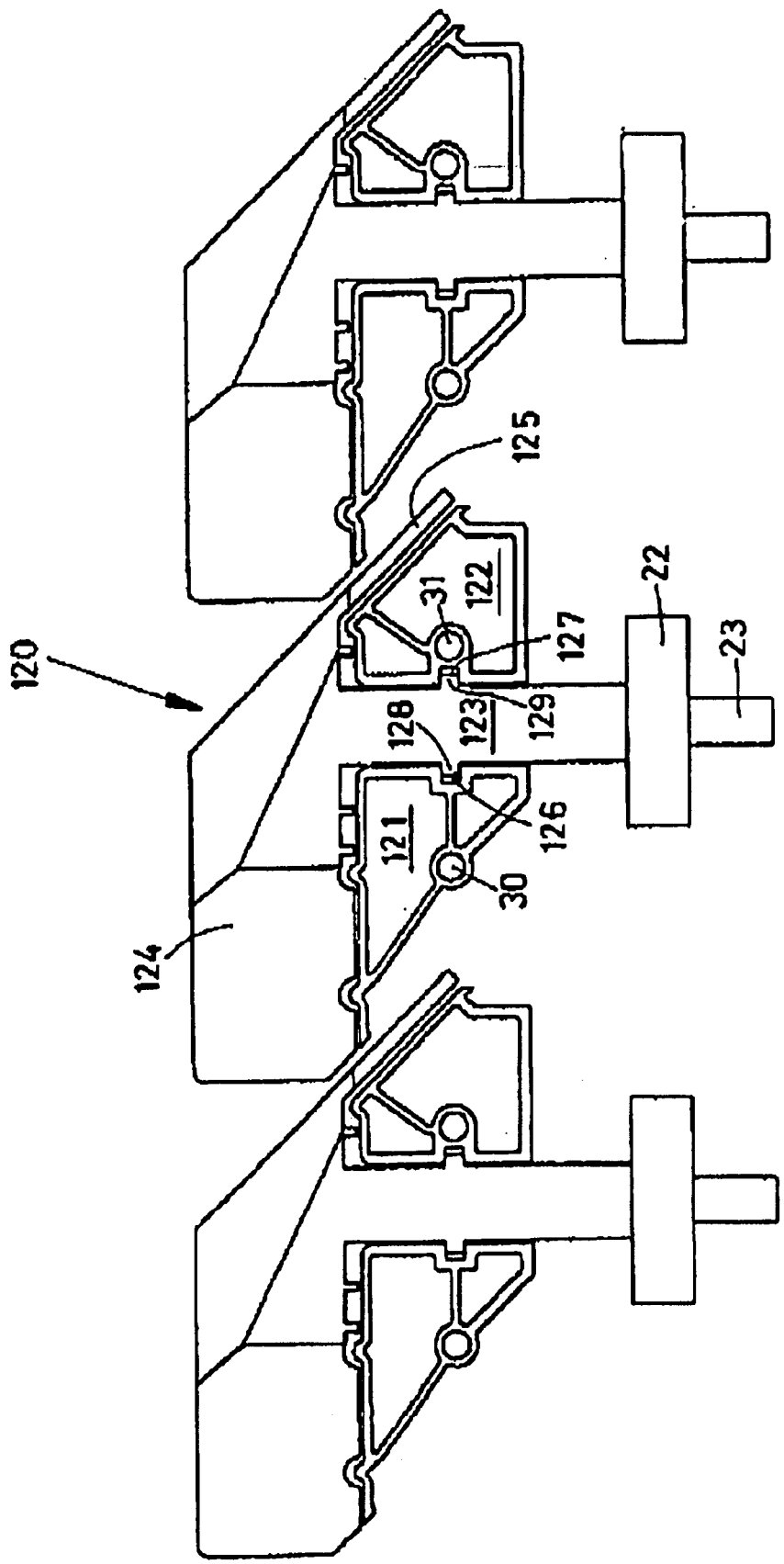

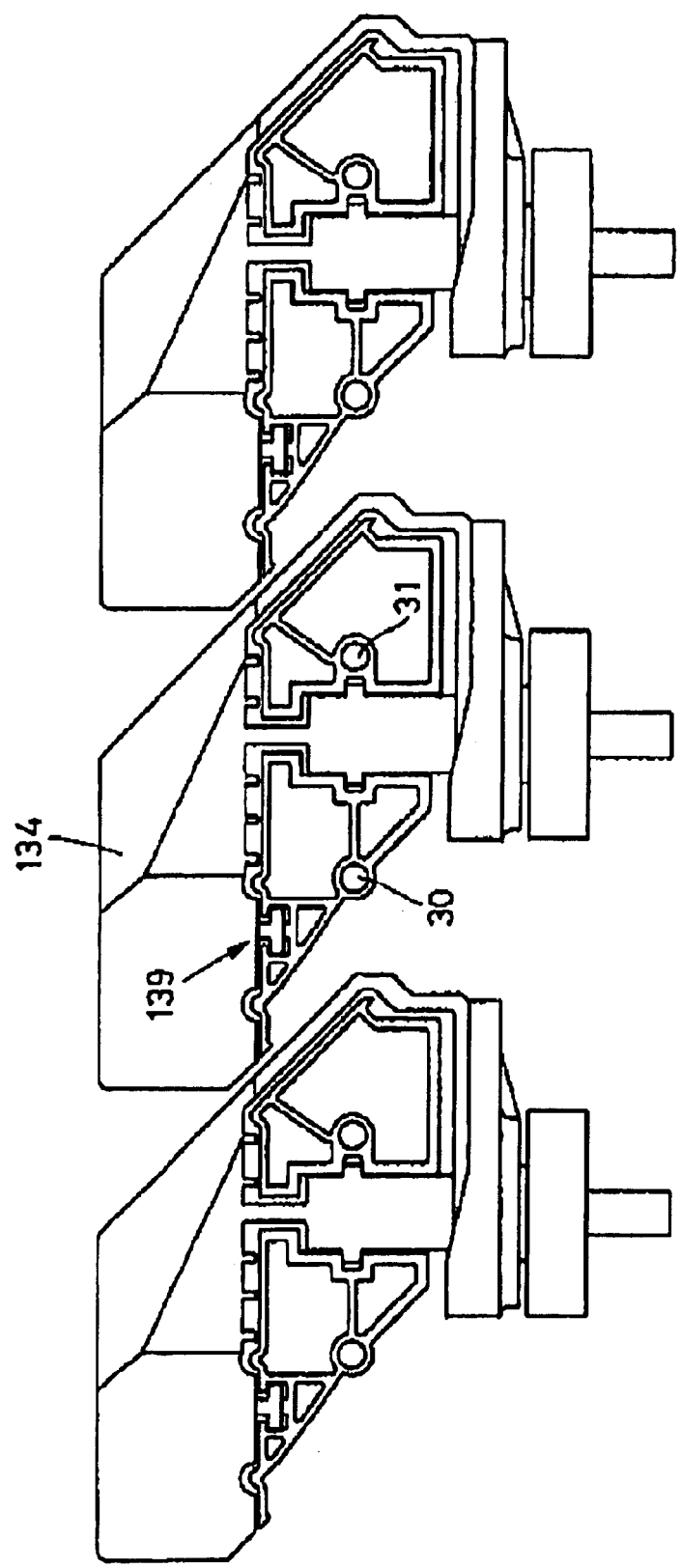

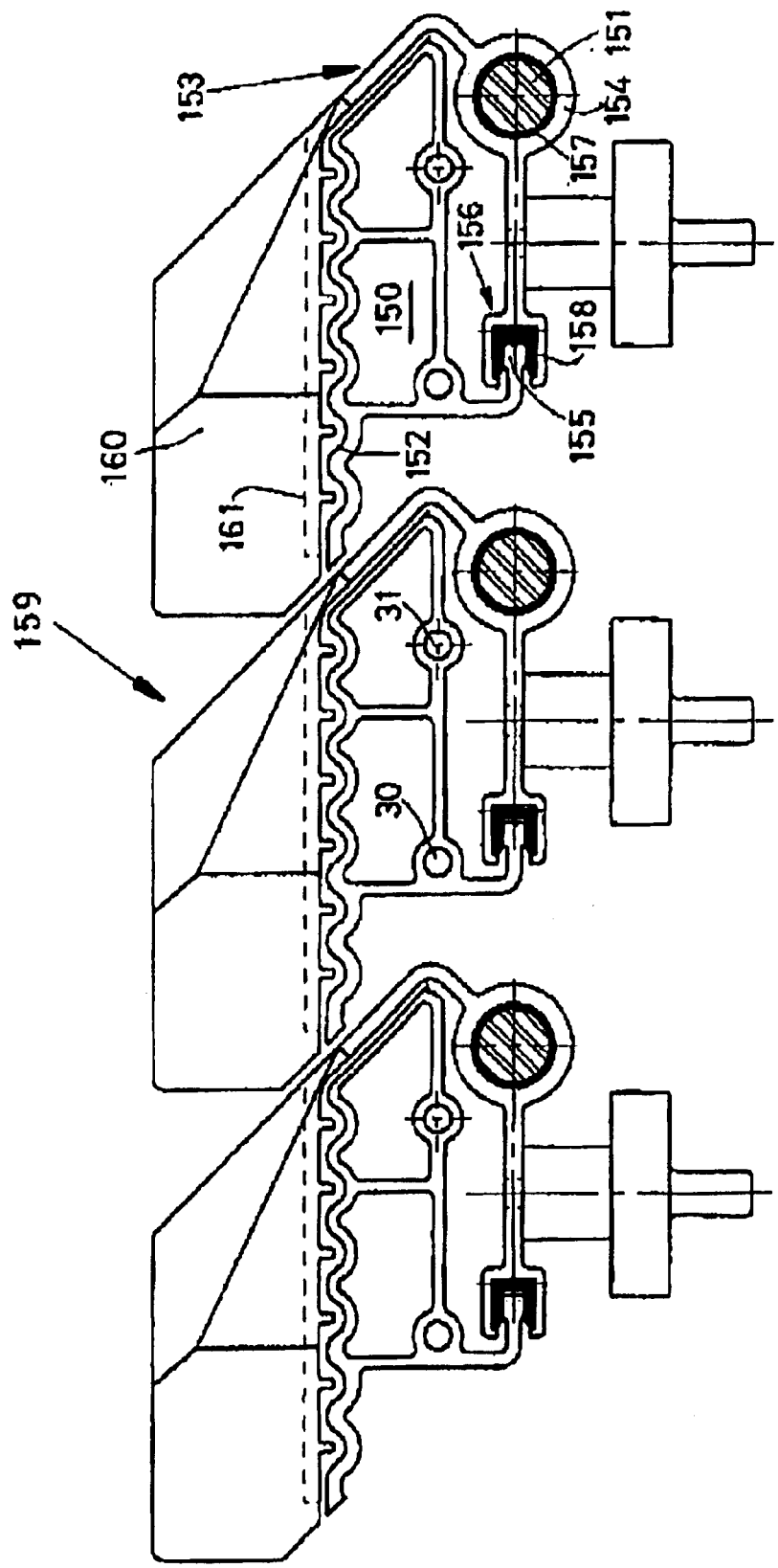

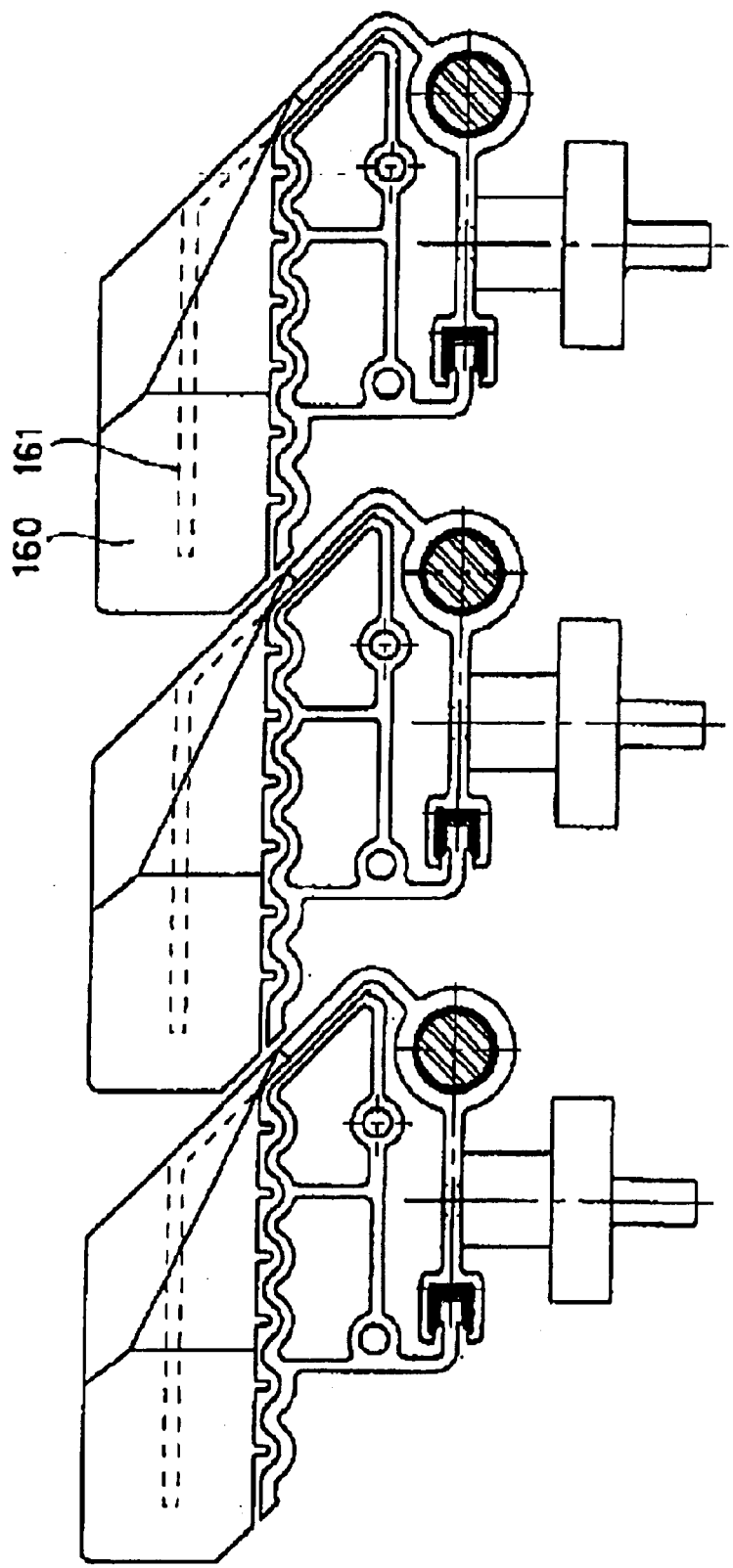

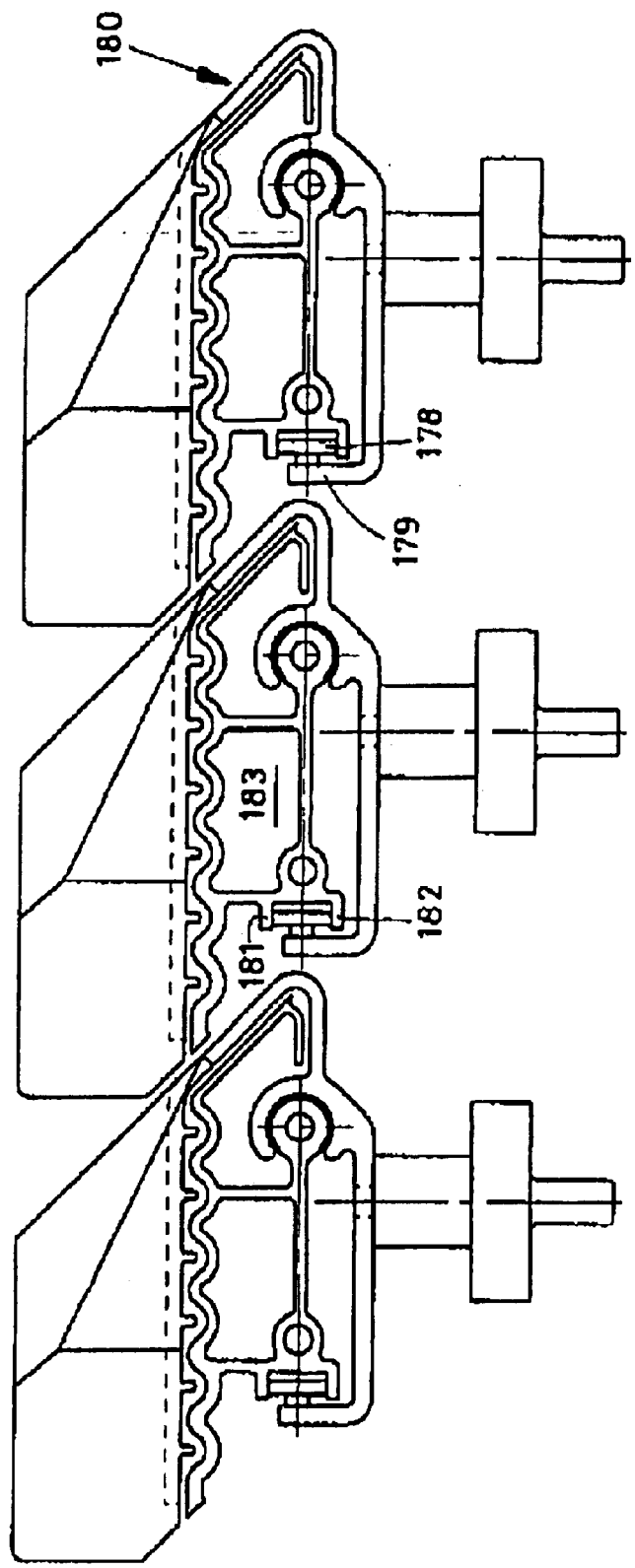

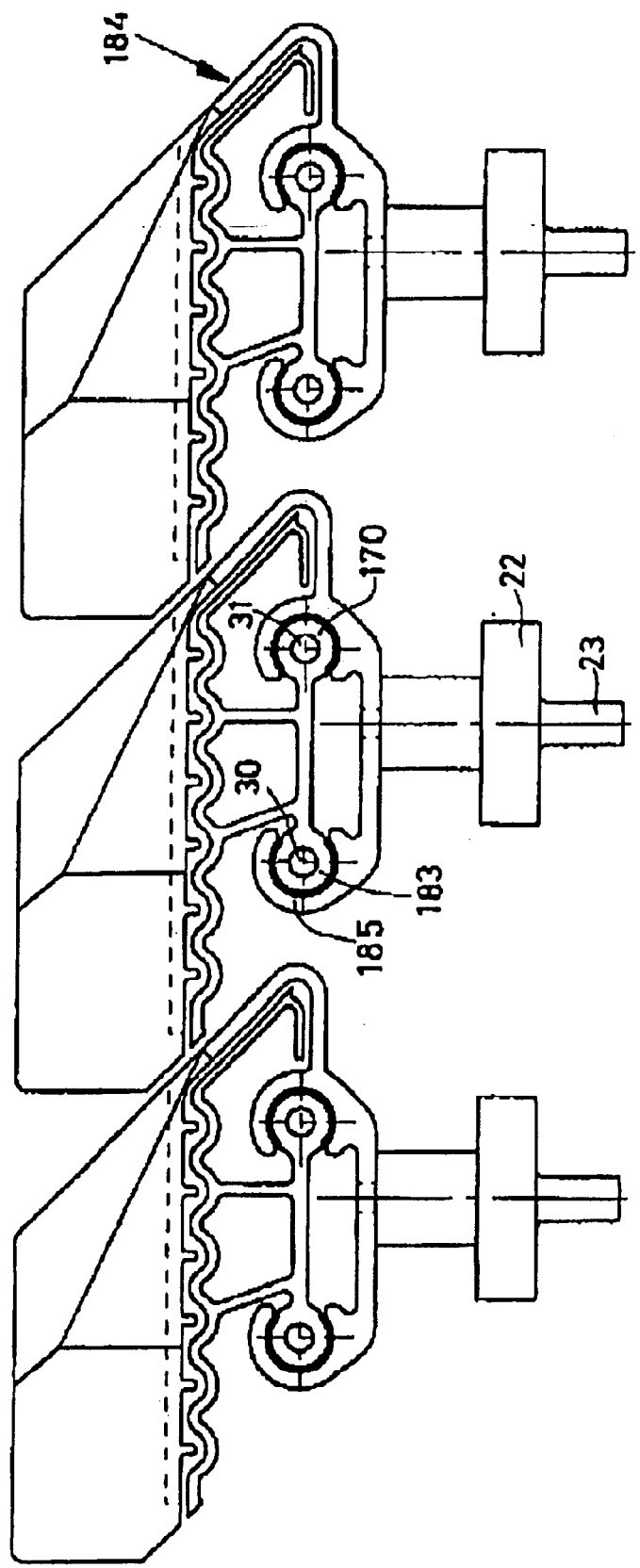

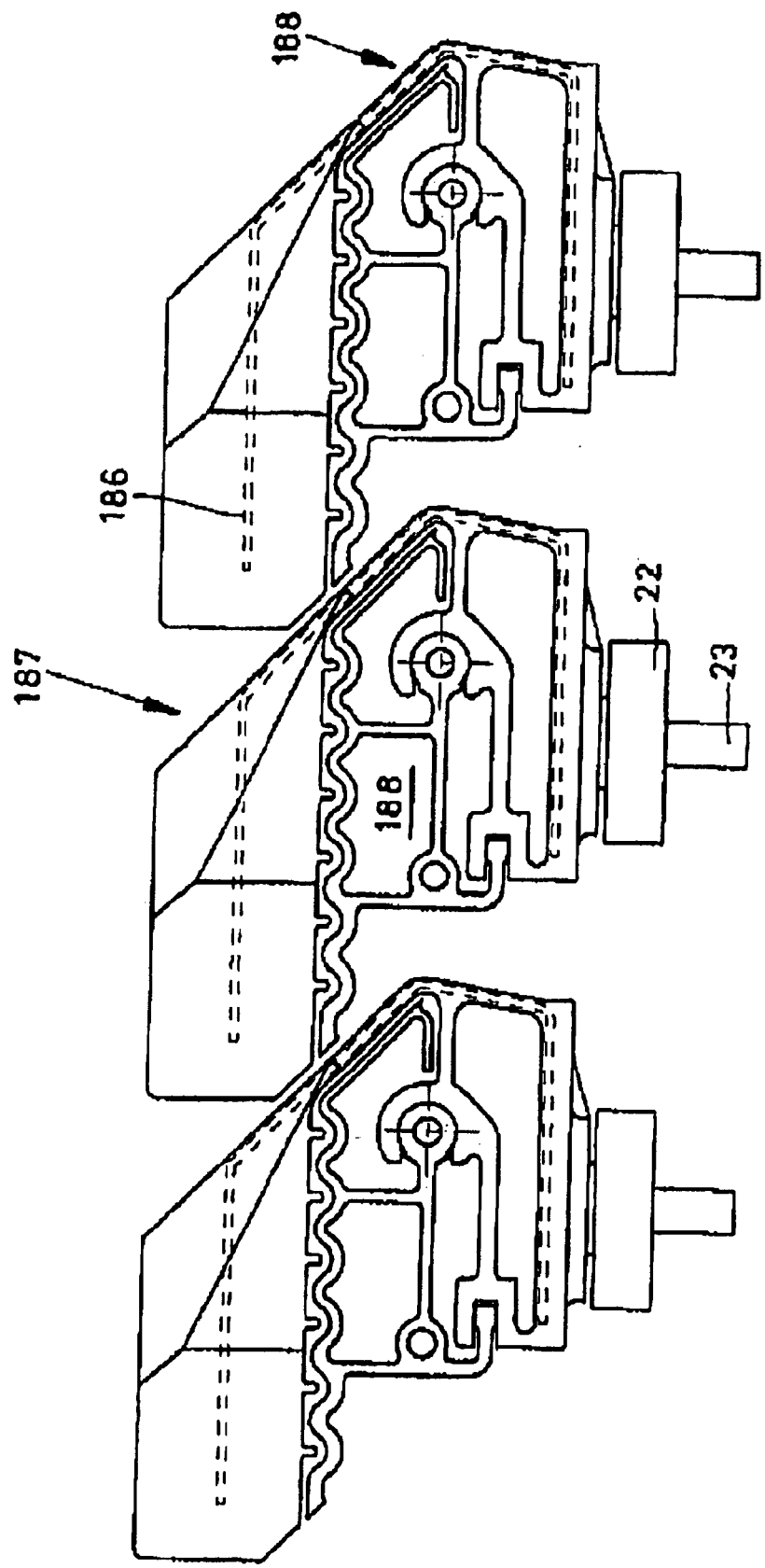

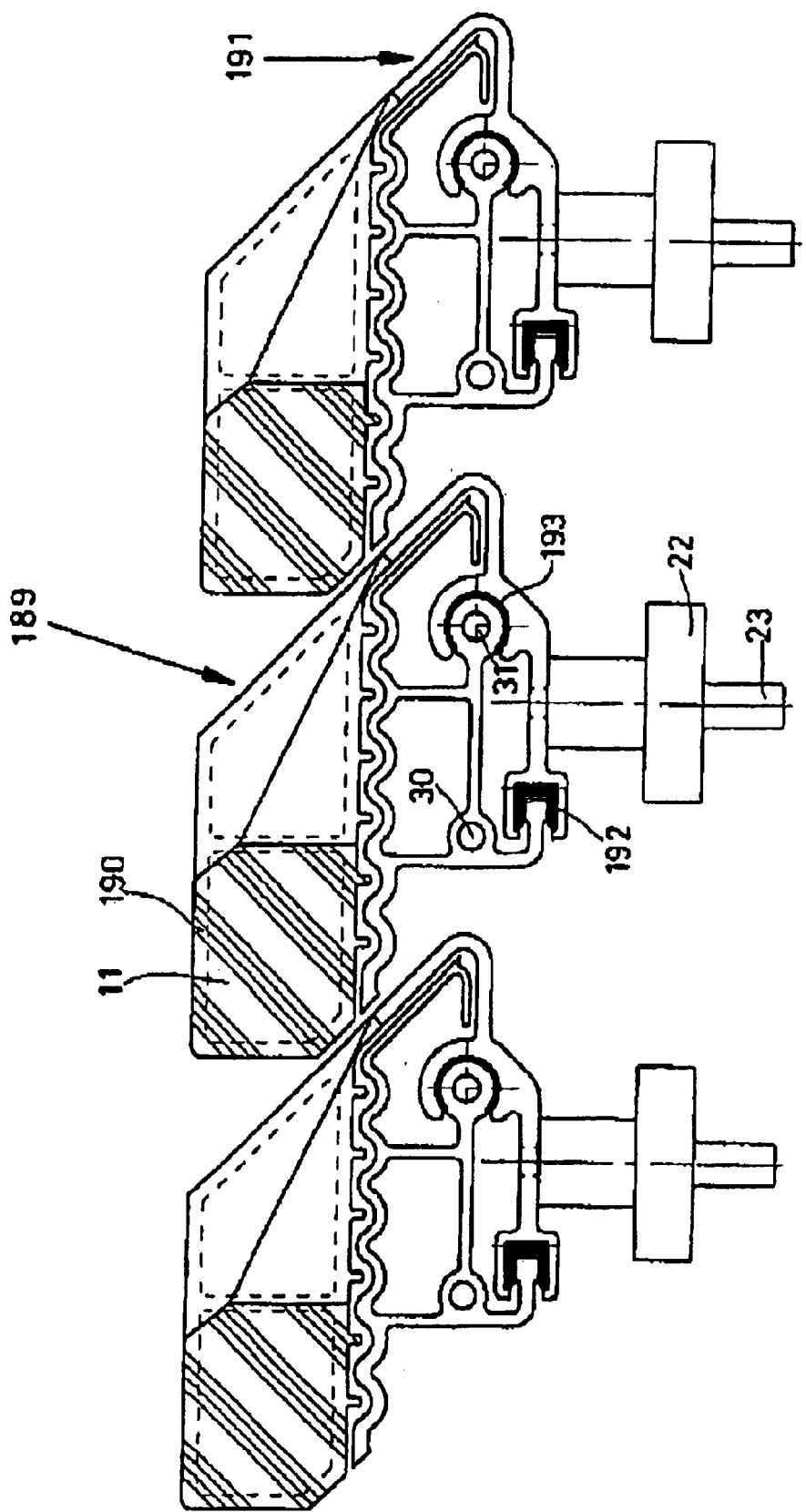

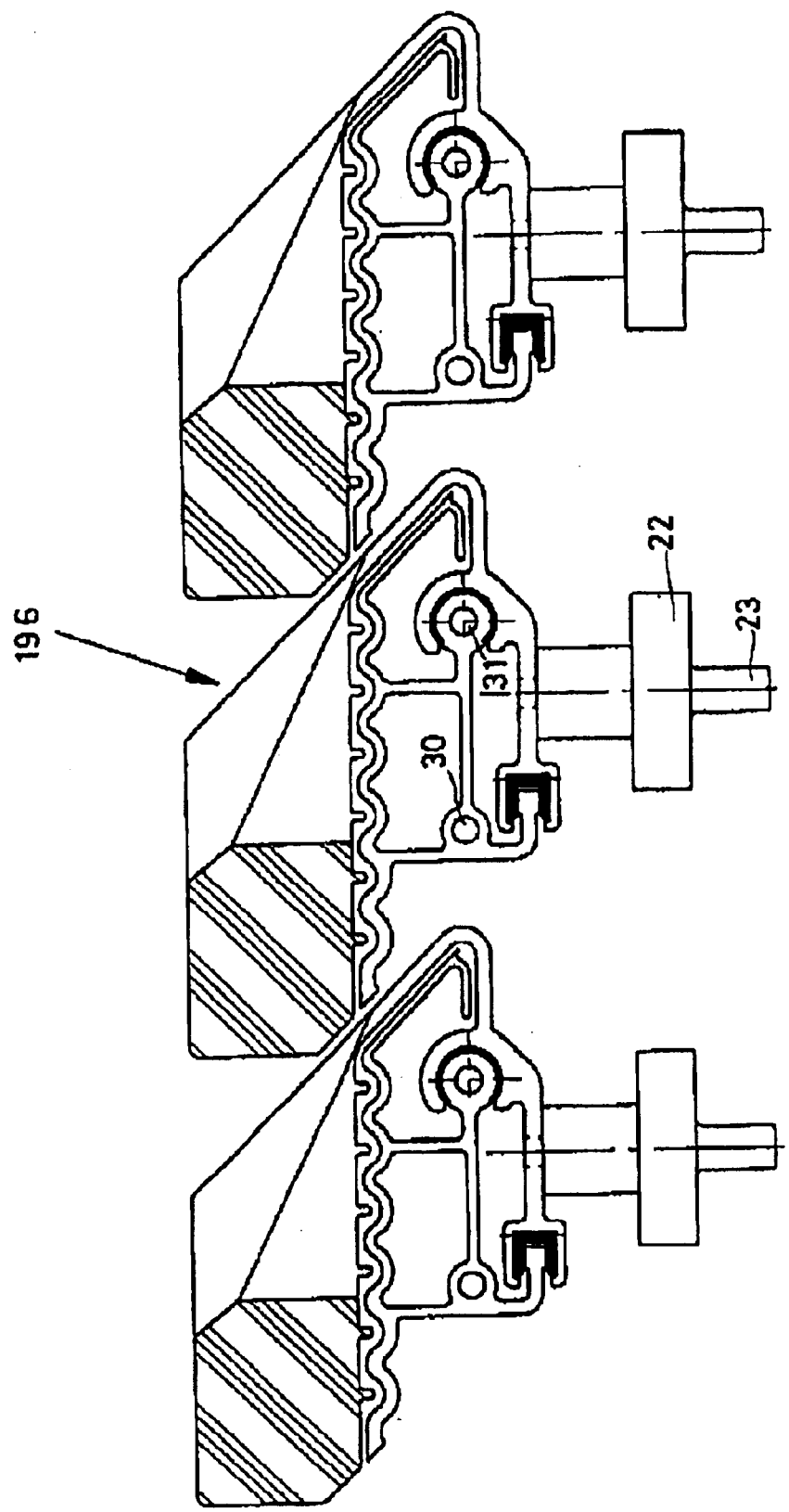

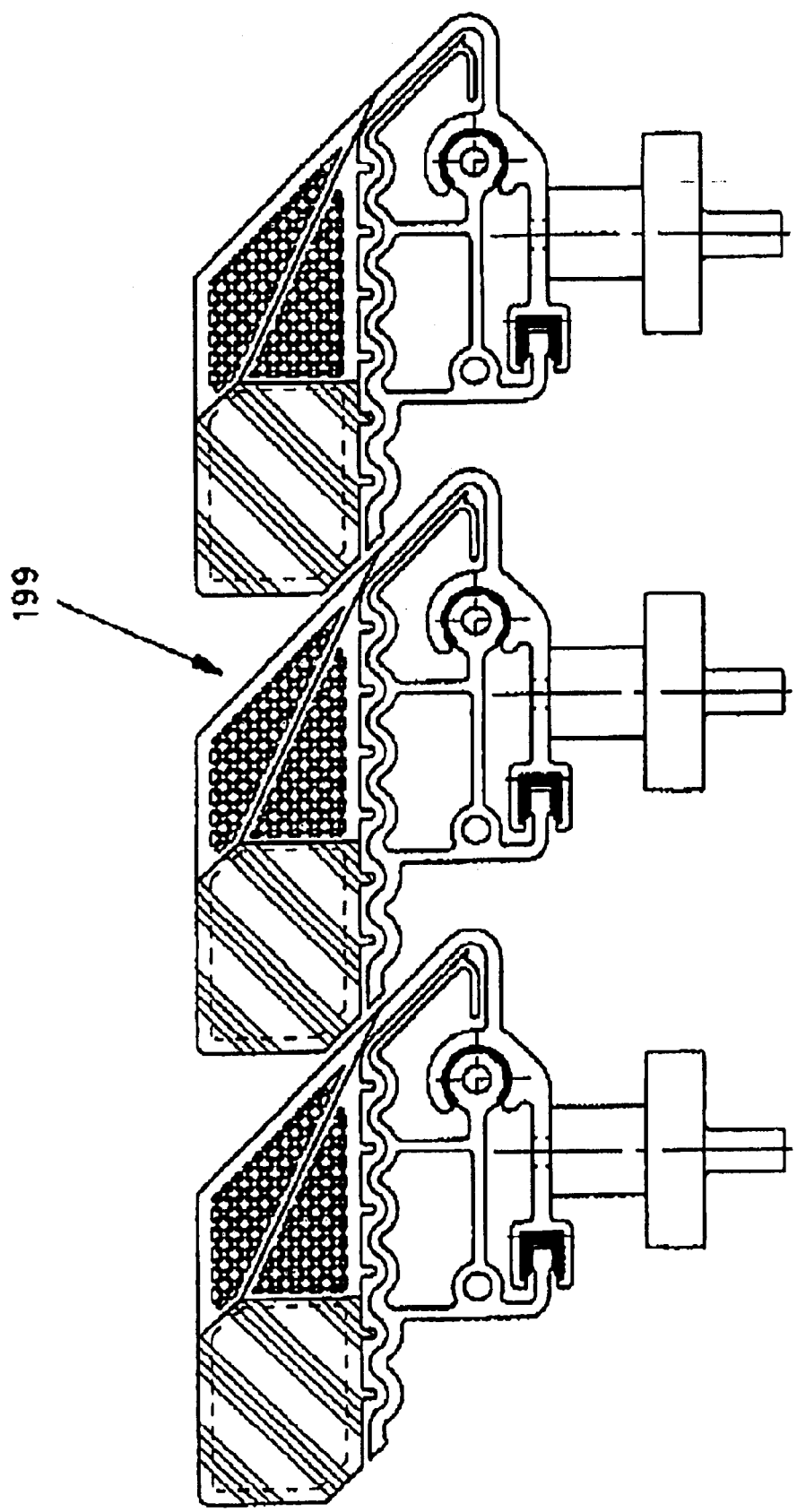

CONVEYOR SYSTEM WITH PUSH SHOES MOVEABLE ALONGSIDE THE SUPPORTS

DESCRIPTION

The invention is related to a conveyor system containing hinged and, in a moving direction, interlinked supports moveable over an infinite moving path, and extending in a longitudinal direction transversely on the moving direction. Each support has on the top side a mainly flat bearing surface extending between the support's front longitudinal top edge and back longitudinal top edge for carrying the products to be transported by the conveyor system, with alongside at least part of said supports one push shoe per support, which is moveable, for example by using guiding means installed alongside the moving path, working with a grip part of the push shoe extending under the support, for moving the products in a longitudinal direction with regard to the support. Each push shoe contains a guiding unit extending under the level of the bearing surface to operate as a conducting means together with the related support, which guiding unit is provided with a contour part extending in a slanting downward direction from a first top longitudinal edge of the support, and with each push shoe further containing a pushing unit for pushing the products in sideward direction, extending above the level of the bearing surface and connected to the guiding unit.

Such a conveyor system is known from European patent application EP-A1-602694, and is used for sorting products, for example for parcel mail. For this purpose, the products are pushed sideways by appropriately steering the guiding means, with the push shoes sliding alongside the supports. The invention of said European patent application is related to a support of which the cross-section is mainly shaped as a parallelogram. Said support is completely enclosed by a push shoe.

The push shoe's guiding unit encloses the support at the bottom side and the oblique front and back sides, while the push shoe's pushing unit on top of the guiding unit seals the top side or the support's bearing surface. The insides of the guiding unit and the pushing unit follow the contours of the support's external side, with inward directed guiding edges of the guiding unit of the pushing unit operating as a conducting means together with the similarly shaped guiding grooves of the support. This means that the push shoe is guided only alongside the support through its guiding unit. The push shoe is retained in relation to the support, both in vertical direction and in the (horizontal) moving direction.

The passage made by the insides of the guiding unit and the pushing unit respectively is therefore also shaped as a parallelogram. This parallelogram's oblique front and back sides are extending downward from the horizontal top surface in the conveying direction, resulting in the front tip of the parallelogram being at the bottom side of the parallelogram.

A crack is situated between adjacent supports. The crack width depends on a number of factors. It is evident that the push shoes must be able to slide alongside the supports and alongside each other. This means that the crack's width must at least be larger than twice the thickness of the push shoe's oblique wall within the crack. In addition, there is a clearance around the crack in conveying direction between the push shoe's inside and the support's outside. The clearance must prevent excessive friction between the push shoe and the support, which even calls for a larger minimal required crack width. Furthermore, it must be noted that the supports at both ends of the conveyor system rotate 180 degrees around a horizontal rotation axis extending parallel to the longitudinal direction of the supports, because of the infinite nature of the moving path.

In view of the inevitable clearance, a certain minimal distance is required between the outsides of two adjacent push shoes to prevent contact between them. All the above requirements limit the capability of the conveyor system of EP 602694-A1 to reduce the crack width between two adjacent supports.

The crack results in the risk that products are stuck completely or partially in the crack between adjacent supports and/or push shoes, which may result in a standstill of the conveyor system or damage to the system or the products involved.

The conveyor system based on U.S. Pat. No. 5,127,510 has the same weakness. Although vital aspects of this conveyor system are different from the conveyor system based on the aforementioned European patent application EP 602694 A1, the description set forth in the first paragraph of said patent application also applies to the conveyor system based on U.S. Pat. No. 5,127,510. The most important difference between both conveyor systems as set forth in the patent specifications is the fact that only the guiding unit of the push shoe contributes to the guiding activity of the push shoe alongside the support in the conveyor system based on EP 602694 B 1, while both the guiding unit of the push shoe and the pushing unit contribute to the guiding activity of the push shoe alongside the support in the conveyor system based on U.S. Pat. No. 5,127,510, because the push shoe and the bottom side of its pushing unit in said U.S. patent are supported by the support's bearing surface. One should note that the guiding unit in the current invention is defined as the part of the push shoe situated under the bearing surface's level, while the pushing unit is defined as the part of the push shoe situated above the bearing surface's level.

This means that the supporting unit (E: support member) as described in said U.S. patent specifications, based on the above definitions for the description of the current patent, is both a part of the pushing unit and of the guiding unit, because the supporting unit extends on both sides of the bearing surface. For this reason, it is not required for the current invention that the guiding unit and the pushing unit of the push shoe are separately identifiable parts. Therefore, one and the same part of the push shoe may be a part of the guiding unit and of the pushing unit of the push shoe.

The invention aims at providing a conveyor system as described in the first paragraph in which the crack width between two adjacent supports is basically smaller than the crack width used in the above state of the art applications, thereby further reducing the risk that products or (protruding) parts fall between adjacent supports and/or push shoes. For this reason, the invention features each push shoe being open at the side across from the guiding unit's contour part extending in the oblique and downward direction. This means that the push shoe only partially encloses the related support creating the possibility to reduce the crack width in relation to the state of the art applications by making the push shoe open at the level of the bearing surface at the side across from the guiding unit's contour part that is extending in oblique and downward direction. The smaller crack width makes it possible to operate the conveyor system more reliably by reducing the risk that products or parts thereof will extend between two adjacent supports. If the drawing distance between two supports is the same, the width of the bearing surface will be further expanded in relation to the state of the art applications, which further reduces the risk that products will be stuck.

Thanks to the invention, the products' common bearing surface formed by the bearing surfaces of the individual supports will be less interrupted by cracks between adjacent supports.

The statement that reducing the crack width is possible thanks to the invention is based on the fact that only material belonging to one push shoe is required between two adjacent supports at the level of the bearing surface, unlike the state of the art applications in which materials of two push shoes are required at said level between two adjacent supports, because the push shoe completely encloses the support. Thanks to the invention, it is possible to reduce the crack width by some dozens of percentages. In addition, since the support is only partially enclosed by the push shoe, the user will be able to save materials and to use a lighter version of the push shoe.

The invention's benefits are specifically shown when the guiding bodies of adjacent push shoes overlap each other in transverse direction perpendicularly to the moving direction and the longitudinal direction, thereby preventing a purely vertical passage to exist between two adjacent push shoes through which products or parts thereof could fall.

However, the invention offers even more benefits if adjacent supports overlap each other partially in transverse direction perpendicularly to the moving direction and the longitudinal direction. Indeed, no purely vertical passage will be present between adjacent supports in which products or parts thereof could be stuck, and the crack width between two adjacent supports will evidently be even smaller at the level of the bearing surface.

In a preferred design based on the invention, the contour part of the guiding unit would extend in oblique and downward direction from the first top longitudinal edge in the direction of the adjacent support located at the side of the first top longitudinal edge. The result will be the related contour part having an upward surface capable of operating as a resistance against downward moves of products or parts thereof between two adjacent shoes or one shoe and an adjacent support.

The benefits will be substantial if the first top longitudinal edge is in line with the front top longitudinal edge. This means that the oblique and downward extending contour part of the guiding unit is located at the front side of the push shoe. The part extending in oblique and downward direction has thus an external surface with a component in an outbound perpendicular line aimed in moving direction, with said surface forcing up products or parts thereof that would incidentally fall in the crack between two adjacent supports, thereby further reducing any interference.

To further stimulate the upward movement of objects or parts thereof, it is preferred that the pushing unit of the push shoe has a frontal surface in the extension of the obliquely and downward extending contour part of the guiding unit.

A very beneficial design of the conveyor system features the support under the bearing surface being provided with at least one vertically operating guide for delivering guiding support to the push shoe thereby preventing any contact between the bottom side of the pushing unit and the bearing surface. It is clear that in such an application the push shoe is not to slide over the support's bearing surface, as described in the above-mentioned U.S. Pat. No. 5,127,510, with gliding contact between the top side of the bearing surface and the push shoe, but alongside this location thereby preventing any such contact.
Preventing such contact, especially any gliding contact, between the push shoe and the bearing surface reduces the amounts of built-up dirt caused for example by leaking products between the push shoe and the support's bearing surface causing contamination of other products and reducing the reliability of the conveyor system.

It is preferred that the support be provided with a vertically operating conductor in at least two different positions, if seen from the conveying direction, to offer efficient resistance against tilting torques around an axis parallel to the support's longitudinal direction, which torques are exercised on the push shoe in an operating environment.

Because the push shoe is open, it is preferred that the support be provided in at least two positions with a vertically operating conductor for delivering guiding support to the parts of the push shoe located at both sides of the guiding unit's obliquely and downward extending contour part. Since the obliquely and downward extending contour part of the guiding unit should be as thin as possible to be able to select the smallest possible crack width between two adjacent supports, there is a risk that the push shoe is too flexible at the location of the oblique, downward part to adequately prevent deformation of the push shoe. Such deformations could be caused when the push shoe moves the products in longitudinal direction. During this process complex mechanical stress is exercised on the push shoe with values directly related to the weight of the product involved. In the occurrence of such deformations, the area of the oblique and downward contour part of the guiding unit could have a virtual bending axis extending in the longitudinal direction of the supports, causing parts of the push shoe located at both sides of the oblique, downward contour part of the guiding unit to bend in relation to each other.

In addition, there could be a virtual, vertical torsion axis located in the area of the oblique, downward contour part of the guiding unit, causing parts of the push shoe located at both sides of the oblique, downward contour part of the guiding unit to twist in relation to each other.

To prevent any expected and unexpected deformations caused by movements of any part of the push shoe in or against the conveying direction, it is preferred that the support be provided under the bearing surface with at least two horizontally operating conductors for the guided enclosure of the push shoe in relation to the support, if seen from the conveying direction. Said two horizontally operating conductors could for example be formed by two opposite vertical sides of a [illegible] or a groove.

Because of any deformation in the push shoe basically caused by too much flexibility in the oblique, downward contour part of its guiding unit, it is preferred that the support be provided at both sides of the oblique downward contour part of the guiding unit with at least two horizontally operating conductors to guide parts of the push shoe located at both sides of the oblique, downward contour part of the guiding unit.

One of the invention's preferred designs has a guiding groove in the support's bearing surface to operate as a conductor together with a guiding edge of the push shoe inside the guiding groove. Such a guiding groove can basically operate horizontally and vertically. In addition, such a guiding groove offers the benefit of completely or substantially preventing the push shoe from twisting around the vertical torsion axis.

It is preferred that such guiding groove be provided with a vertically operating conductor under the bearing surface for the provision of guiding support to the push shoe thereby preventing any contact between the push shoe and the support's bearing surface. The benefits of preventing such contact have been set forth in the above paragraphs.

An alternative benefit or a further preferred design combined with such vertically operating guide is the possibility to provide the guide screw with a horizontally operating conductor under the bearing surface for retaining the push shoe in a guiding fashion in relation to the support, if seen from the conveying direction. Such guide screw is therefore able to combine various guiding functions.

An alternative, beneficial design of the conveyor system based on the invention features the support consisting of two parallel bearing parts with a vertical passage between them over the full height of the support for passage of a part of the push shoe. Since the structural connection between a part of the push shoe located above the support and another part located under the support goes through said passage, the amount of material between two adjacent supports can be restricted to the required minimum. In addition, since said connection between the part of the push shoe above the support and the part under the support is located between the push shoe's ends if seen in conveying direction, the mechanical stress, especially the bending torque, exercised on the push shoe will basically reduce the amount of deformation of the push shoe in comparison with a situation whereby the part of the push shoe under the support and the part above the support are connected outside of a support.

It would be very beneficial if all sides of the bearing parts of a support that are directed toward each other are provided with at least one vertically operating conductor to deliver guiding support to the push shoe thereby preventing any contact between the push shoe and the support's bearing surface. The benefits of preventing such contact have been set forth in the above paragraphs. Providing said sides with one or more active conductors offers a simple structural solution.

The same benefit is offered if all sides of the bearing parts of the support that are directed toward each other are provided with at least one horizontally operating conductor to retain the push shoe in a guiding fashion in relation to the support, if seen from the conveying direction. Furthermore, it is very likely that the sides that are directed toward each other will operate as horizontally active conductors.

To prevent a wider than required passage at the level of the bearing surface, the beneficial design also offers the possibility to make the width of the passage at the level of the bearing surface smaller than the width under the level of the bearing surface. This makes it possible to position, for example, vertically operating conductors at the sides of the bearing parts that are directed toward each other at a higher distance from each other than the width of the passage at the level of the bearing surface.

A very beneficial design of the conveyor system based on the invention features the push shoe containing a metal connector for (at least supporting) the interconnection of the guiding unit and the pushing unit. Particularly noted hereby is the fact that the preferred design does not require the guiding unit and the pushing unit to be separate parts. Indeed, it is very well possible that the guiding unit and the pushing unit are one integral component. The inherent firmness of the push shoe can be enhanced by using a metal connector thereby reducing the number of connectors with the support without resulting in unacceptable deformations of the push shoe. Very useful metals for this purpose include aluminum, stainless steel and sheet steel.

A very useful design of the metal connector is based on a metal brace with the ends extending both within the guiding unit and the pushing unit.

Another very useful design is the metal connector being an integral part of the guiding unit, and not only serving as a connector between two parts, but also guiding the push shoe in relation to the support.

To ensure the proper conduction, it is preferred that the guiding unit be provided with sleeve bearings to support the guiding activity of the related support. Such sleeve bearings ensure the proper conduction and can be easily replaced should they be worn out. Additional benefits for the operation of the system are reduced noise and extended life.

It is preferred that the parts of the guiding unit and/or the pushing unit in synthetic material are connected with a metal connector.

It is preferred that any part of the pushing unit made of a synthetic material be connected to a straight part of the metal connector extending parallel to the bearing surface. To connect the metal connector and the part of the pushing unit made of a synthetic material, it is, for example, possible to slide a pushing unit over the straight part of the metal connector extending parallel to the bearing surface, and then attach it to the metal connector.

From a production engineering perspective, it may be very beneficial if the parts of the guiding unit and the pushing unit made of synthetic materials are one integral component made of a synthetic material. It is assumed that this integral synthetic material component is made in an injection molding process, for which only one mould is required, with the guiding unit and the pushing unit being made in one process step. In addition, this preferred application of the invention is not limited to designs in which the guiding unit and the pushing unit are inflexibly connected to one another. Indeed, they may also be connected by a hinge, for example by using a film hinge. The film hinge could be located exactly at the junction of the guiding unit and the pushing unit. In an alternative design, the film hinge could be positioned around the oblique, downward working part of the guiding unit.

The connection between the guiding unit's and the pushing unit's parts in synthetic material and the metal connector can be very easily realized by attaching the parts in synthetic material of the guiding unit and the pushing unit to the metal connector by using snap connections.

From a production engineering perspective, it may also be very beneficial if at least one of the parts in synthetic material of the guiding unit and the pushing unit is made in an injection molding process whereby the metal connector is injected during such process in this one part. This would eliminate the need for a later, separate assembly process to connect at least one of the parts in synthetic material of the guiding unit and the pushing unit with the metal connector, while maintaining a very reliable connection between the metal connector and that one part.

It is noted for purposes of clarity that the use of the term "injected" does not exclude a condition with the metal connector being located at the external surface of the push shoe.

A very beneficial application of the conveyor system based on the invention would be if at least the guiding unit of the push shoe is at least substantially made of an aluminum alloy. As set forth further in the document, any appropriate type of an aluminum alloy is easy to process by using various manufacturing techniques. The guiding unit can be very easily formed in an extrusion mould. The specific types of aluminum alloys are extremely indicated for extrusion purposes, and therefore for use as the guiding unit in a push shoe.

The invention also accounts for the beneficial effects of using an aluminum alloy as the material for at least one part of the push shoe's pushing unit, specifically for that part of the pushing unit that has a constant cross-section if seen in longitudinal direction, which part could also be made in an extrusion process.

It is preferred to attach at least one contour part of the pushing unit in synthetic material to the part of the pushing unit made of an aluminum alloy. The cross-section of such contour parts is not constant if seen from the longitudinal direction. Such parts are therefore not the direct output from an extrusion process.

Based on the invention, it is even possible to make the entire push shoe, the pushing unit included, at least substantially from an aluminum alloy. This eliminates the need for separately attaching the contour parts in synthetic material, as aforementioned, to the aluminum alloy material of the push shoe. Only the rubber bushes on the push shoe's pushing surfaces may be an exception thereto.

Such a push shoe made virtually entirely from an aluminum alloy is possible if the entire push shoe is at least substantially a cast product. Types of aluminum alloys useful for this purpose are available.

As indicated above, also the alternative has its benefits, if part of the pushing unit made of an aluminum alloy is an extruded product.

If the pushing unit of the push shoe is to be made with a contour part, i.e. with a part that does not have a constant cross-section if seen in longitudinal direction, the extruded part of the pushing unit can very well undergo a mechanical finishing process to create at least one contour part of the pushing unit.

The invention is further related to a conveyor system containing hinged and, in a moving direction, interlinked supports moveable over an infinite moving path, and extending in a longitudinal direction transversely on the moving direction. Each support has on the top side a mainly flat bearing surface extending between the support's front longitudinal top edge and back longitudinal top edge to carry the products to be transported by the conveyor system, with alongside at least part of said supports one push shoe per support, which is moveable, for moving the products in a longitudinal direction with regard to the support. Each push shoe contains a guiding unit extending under the level of the bearing surface for operating as a conducting means together with the related support, and with each push shoe further containing a pushing unit for pushing the products in sideward direction, extending above the level of the bearing surface and connected to the guiding unit. Such a conveyor system is known from the aforementioned EP-A1-602694 patent application. The invention aims, whether or not by using further preferred applications, at providing a conveyor system in which the movement of the push shoes alongside the related supports results in reduced noise and wear and tear.

For this purpose, the conveyor system first features each push shoe containing at least one rolling unit able to rotate around an axis unit for rolling contact with the support, with said axis unit attached directly to a component in synthetic material of the push shoe. Unlike push shoes sliding alongside the support with a gliding contact between the components of the push shoes and the supports, the use of one or more rolling units based on the invention will reduce the noise and the level of wear and tear. In addition, the manufacturing costs for the structure will be relatively low, because the axis unit will be attached to a component in synthetic material of the push shoe thereby eliminating the need to use metal parts.

It is preferred to clamp the axis unit in the component in synthetic material of the push shoe. This type of attachment can be easily and at low cost realized during the push shoe's manufacturing process.

For example, it would be possible and beneficial to clamp the axis unit in a round recess of the push shoe.

Alternatively, it could also be very beneficial to clamp the axis unit on both sides of the related rolling unit between two legs, preferably of a U-shaped recess, with said legs extending perpendicularly to the axis unit's axial direction.

In addition, the manufacturing costs may also be reduced because the rolling unit is able to rotate around the axis unit by means of a sleeve bearing without adversely affecting the level of noise generated by the operation of the conveyor system.

Although it is, based on the invention, very well possible to use a metal axis unit, it may also be very beneficial to make the axis unit from a synthetic material.

An axis unit made from a synthetic material offers at least benefits if the axis unit is an integral part of the push shoe's component in synthetic material. This means that the axis unit can be manufactured in one step of the injection molding process, together with the remaining part in synthetic material of the push shoe, which push shoe can be made virtually entirely from a synthetic material, thereby reducing the costs and eliminating separate assembly costs for connecting the axis unit with the push shoe.

Optimal use of at least one rolling unit is realized if it can establish a rolling contact with the support at two opposite sides. Since the moving directions of the rolling unit at two opposite sides will evidently be opposite, the rolling contact between the rolling unit and the support will actually only be established at one side.

The rotation axis being perpendicular to the bearing surface will ensure excellent guiding of the push shoe alongside the support.

The same benefit is offered if at least one rolling unit maintains a rolling contact with the bearing surface thereby supporting the push shoe through the bearing surface.

It is preferred, especially for the above preferred application, to have the rotation axis extending in the moving direction. It must be especially noted that the invention not only relates to a conveyor system with each push shoe containing only one rolling unit, but also to conveyor systems in which each push shoe contains several rolling units. Depending on their functions, such rolling units may have rotation axes going in different directions.

Even distribution of the guiding function and a number of rolling units of the push shoe can be realized if each guiding and pushing unit is provided with at least one rolling unit.

To increase mechanical firmness in the push shoe it is preferred that the push shoes completely enclose the related supports.

To prevent that any objects or parts thereof fall between two adjacent push shoes, it is recommended to provide the guiding unit with a contour part extending in oblique and downward direction from the first top longitudinal edge.

In addition, it is further preferred that each push shoe be open at the side located opposite to the oblique and downward contour part of the guiding unit, as set forth above.

To facilitate the assembly of the rolling units in the push shoes, it is preferred that each push shoe is made of two main parts that can be disconnected. Each main part should not fully enclose the support.

The assembly of the push shoe will then be easy if the main parts can be hinged around a hinging axis extending in longitudinal direction.

The invention will now be further explained by using the descriptions of the following drawings:

FIGS. 4a–4h show a third set of preferred applications of the support/push shoe combinations that may be used in a conveyor system based on the invention;

FIGS. 5a–5c show a fourth set of preferred applications of the support/push shoe combinations that may be used in a conveyor system based on the invention;

FIGS. 6a and 6b show a fifth set of preferred applications of the support/push shoe combinations that may be used in a conveyor system based on the invention;

FIGS. 7a–7k show a sixth set of preferred applications of the support/push shoe combinations that may be used in a conveyor system based on the invention, with FIG. 7i being the top view of FIG. 7h, and FIG. 7k being the top view of FIG. 7j.

Figure 1:
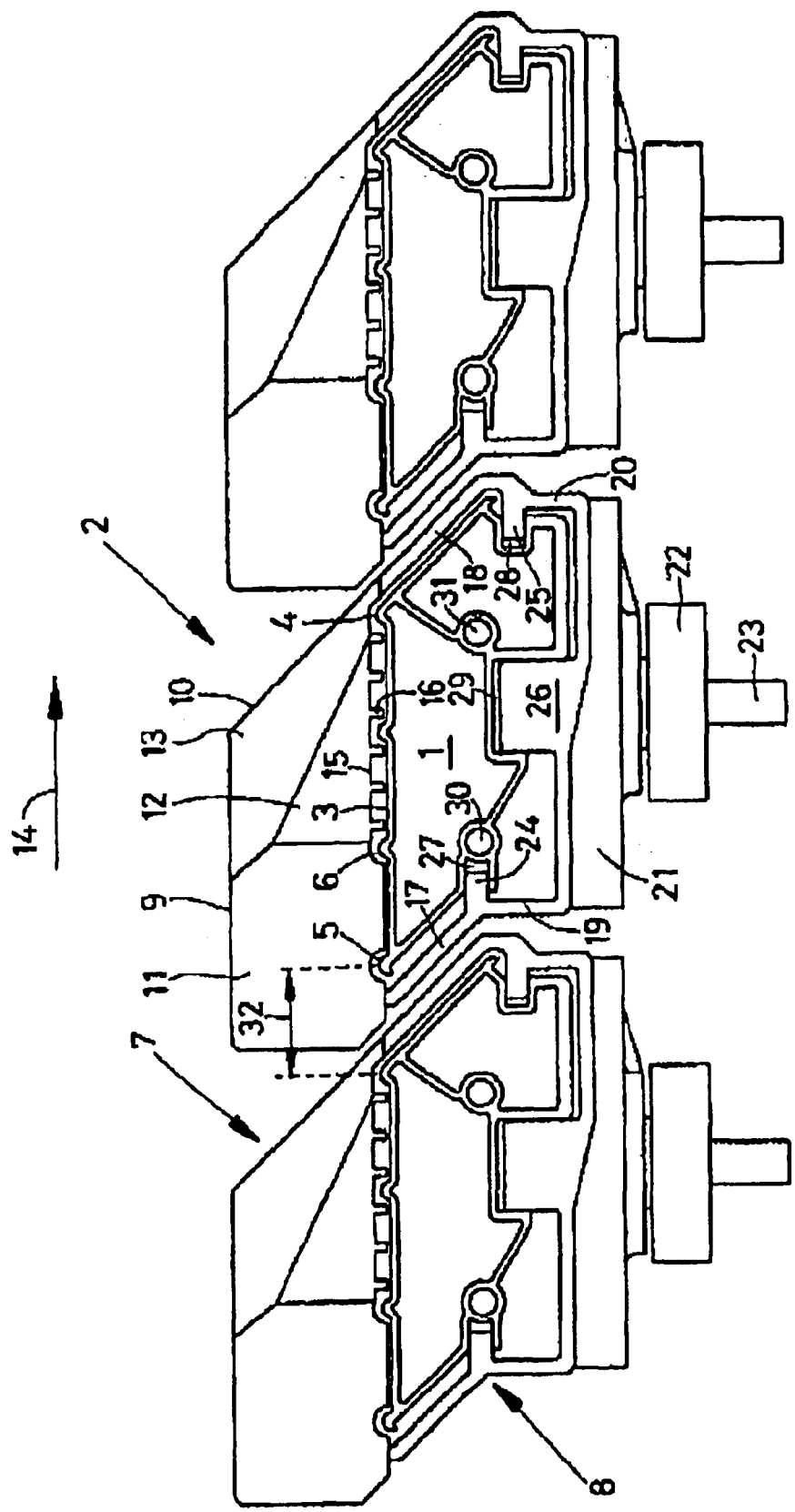
FIG. 1 shows the cross-section of a support with push shoe in state of the art applications.

FIG. 1 shows a cross-section of three combinations of adjacent supports 1 with related push shoes 2 in state of the art applications. This combination is virtually identical to the support and the push shoe described in European patent application EP-A1-602694. The similarity is especially related to push shoe 2.

Support 1 is an extruded aluminum profile part provided at the top side with a bearing surface 3 extending between the front top longitudinal edge 4 and the back top longitudinal edge 5. Despite the presence of longitudinal grooves 6, including at the front top longitudinal edge 4 and the back top longitudinal edge 5, the bearing surface 3 is mainly flat. The push shoe 2 is deemed to be constructed from a pushing unit 7 extending above the level of the bearing surface 3 and a guiding unit 8 extending under the level of the bearing surface 3. The pushing unit 7 contains a flat top surface 9 extending parallel to the bearing surface 3, a downward slanting front surface 10, a vertical pushing surface 11, a vertical, triangular limiting surface 12, and a sliding surface 13 between the top surface 9, the front surface 10, the pushing surface 11 and the limiting surface 12.

Because the push shoe 2 shows a mirror symmetry with regard to an imaginary vertical mirror surface extending parallel to the conveying direction 14, said surfaces 9–13 are present twice per push shoe 2, and, more specifically, per pushing unit 7. The contours of pushing unit 7 defined by said surfaces 9–13 make the pushing unit 7 very useful for sideways pushing products on the bearing surfaces 3 of adjacent supports 1. Also the further to describe preferred applications of the invention have similar contours on the pushing unit of the related push shoe. For this reason, reference is made to FIGS. 7i and 7k showing a top view of the push shoes and said surfaces 9–13 for a further description of the contours of the pushing unit 7. It is noted for the bottom surface 15 of the pushing unit 7 that it is different from the bottom surfaces of the sorting units of the push shoes based on the further to describe preferred applications. Noted here for the bottom surface 15 of the pushing unit 7 is the fact that it is provided with downward extending edges 16 with the bottom sides being located under the top sides of the longitudinal grooves 6. This prevents products on the tips of the longitudinal grooves 6, regardless of the flatness, from falling between the bottom surface 15 and the bearing surface 3 of the support 1, while it remains possible to move such products for sorting purposes in the longitudinal direction of support 1, perpendicular to the drawing's plane. In the context of the invention, it is also important to note the presence and the width of crack 32 between the front top longitudinal edge 4 of a first push shoe 2 and the back top longitudinal edge 5 of a second push shoe 2 situated before the first push shoe 2. This width should be at least such that two push shoes 2 can pass alongside each other.

The guiding unit 8 substantially follows the contours of support 1 and, together with pushing unit 7, completely encloses support 1. For this reason, the guiding unit 8 is provided at the back side and at the front side with oblique forward and downward walls, 17 and 18 respectively, and, from the bottom sides of the walls 17, 18 extend the vertical walls 19, 20, which in turn are connected at their bottom sides to each other by base 21 of the guiding unit 8. Pointed at the bottom side of base 21 are a rotating guiding wheel 22 and a guiding pin 23. Guiding wheel 22 can be rotated around a vertical axis in relation to base 21. Inward directed, horizontally oriented guiding edges 25, 25 are located at the inside, at the level of the respective junctions of oblique walls 17, 18 and vertical walls 19, 20. Centered above guiding wheel 22 and guiding pin 23 is also a vertically oriented guiding edge 26 extending from the inside of base 21. Guiding edges 24, 25, 26 extend within U-shaped guiding channels 27, 28, 29 that are parts of guiding unit 8. Both legs of each U-shape of the guiding channels 27, 28, 29 serve as guides for the side directed to the related leg of the related guiding edges 25, 25, 26. One may say that each leg of the U-shaped guiding channels 27, 28, 29 act as guides. The guiding channels 27 and 28 operate in vertical direction, because they retain guiding edges 24, 25 and therefore the entire push shoe 2 in vertical direction, while guiding channel 29 operates in horizontal direction because it retains guiding edge 26, and therefore the entire push shoe 2 in horizontal direction. It is also noteworthy that support 1 is provided with two connecting holes 30, 31 making it possible to easily attach a coupling plate (not shown) at each side of each support 1.

Also connected to the coupling plate (not shown) is a chain of which the pulling distance corresponds to the distance between two adjacent connecting holes 30, 31. By driving the infinite chain, the supports 1 and the push shoes 2 are moved in the conveying direction 14.

As explained below, the supports of the invention's preferred applications also have such connecting holes 30, 31 located at the same pulling distance from each other. This makes it possible to replace supports 1 and push shoes 2 based on state of the art applications, as explained in FIG. 1, by support/push shoe combinations, as further detailed below, because they are further provided with a guiding wheel 22 and a guiding pin 23 at the same positions. It must be specifically noted that it is evidently also possible to realize the coupling of the supports with the coupling plates and/or the guiding wheels 22 and guiding pins 23 in another way within the context of the invention. It is also noted at this point that all sorting units of the push shoes of the further to describe preferred applications have at least substantially the same external contours as the pushing unit 7 of the push shoe 2 based on state of the art applications. An exception is the bottom surface 15 of the pushing unit 7, which is different from the state of the art applications in certain preferred applications.

FIGS. 2a–2e show five different related preferred applications of support/push shoe combinations that may be used in a conveyor system based on the invention. Because the supports and the push shoes of the various preferred applications have only minor differences, matching reference numbers, 40 and 41, will be used.

Support 40 is provided at the bottom side with two opposite, if seen from the conveying direction 14, tubular guides 42, 43. A T-shaped guiding profile 45 is located at base 44, which both form an H-shaped guiding profile. Tubular guides 42, 43 are respectively located between the legs of this H-shape completely retaining, in horizontal and in vertical direction, at least the part of push shoe 41 located under the oblique, downward extending wall 46.

It is noteworthy in the context of the invention that base 44 and pushing unit 47 of push shoe 41, made primarily of a synthetic material, are connected with each other at only one side of support 40, i.e. through the oblique, downward extending wall 46. This results in view of the open nature of push shoe 41 in a substantially lower firmness than is the case for the closed push shoe 2 in state of the art applications, if identical materials and similar dimensions are used. The reduced firmness is specifically shown in the area around the oblique, downward extending wall 46 thereby creating the risk that base 44 and pushing unit 47 change positions because of deformations of the oblique, downward extending wall 46. Additional guiding provisions have been applied to prevent this from occurring. Bearing surface 48 has a downward extending guiding groove 51 between the front top longitudinal edge 49, made as a longitudinal groove, and the longitudinal groove 51 situated behind it. Within this guiding groove 51 extends a guiding edge 53 in downward direction from the bottom surface 52, making it possible for the vertical walls of guiding edge 53 to act as guides together with the vertical walls of the guiding groove 51. This retains the pushing unit 47 in the conveying direction 14 with regard to support 40 thereby preventing unacceptable deformations in push shoe 41 as a result of the external mechanical stress exercised on the push shoe 41, especially through pushing unit 47.

Support 40 is provided near the back top longitudinal edge 53 with an outward directed guiding groove 54, which is open at the back side, also in view of the horizontal supporting edge 55 at relatively short distance under the level of bearing surface 48. Pushing unit 47 is provided at the back with an L-shaped guiding unit 56 extending from the bottom surface 52, with the end being within guiding groove 54 to retain pushing unit 47 also in vertical direction. The above additional guiding provisions, specifically for push shoe 41, prevent unacceptable moves of push shoe 47 in relation to base 44 of push shoe 41 caused by the deformation of push shoe 41 at the oblique, downward extending wall 46. Because the L-shaped guiding unit 56 can be made much finer than the oblique, downward extending wall 17 of the application shown in FIG. 1 (state of the art), it is possible to expand, in comparison with state of the art applications, the distance between the front top longitudinal edge 49 and the back top longitudinal edge 53 of a push shoe 41 (or the width of the bearing surface 48), and make it larger than the distance between the front top longitudinal edge 4 and the back top longitudinal edge 5 of a push shoe 2 (or the width of bearing surface 3), resulting in the fact that, with a same pulling distance, the distance 57 between the front top longitudinal edge 49 of a first push shoe 41 and the back top longitudinal edge 53 of a second push shoe 41 located before the first push shoe is reduced in comparison to the corresponding distance 32 in the state of the art application as described in FIG. 1. This reduces the risk that objects or parts thereof fall between two adjacent supports and/or push shoes and/or supports and push shoes.

Figure 2A:
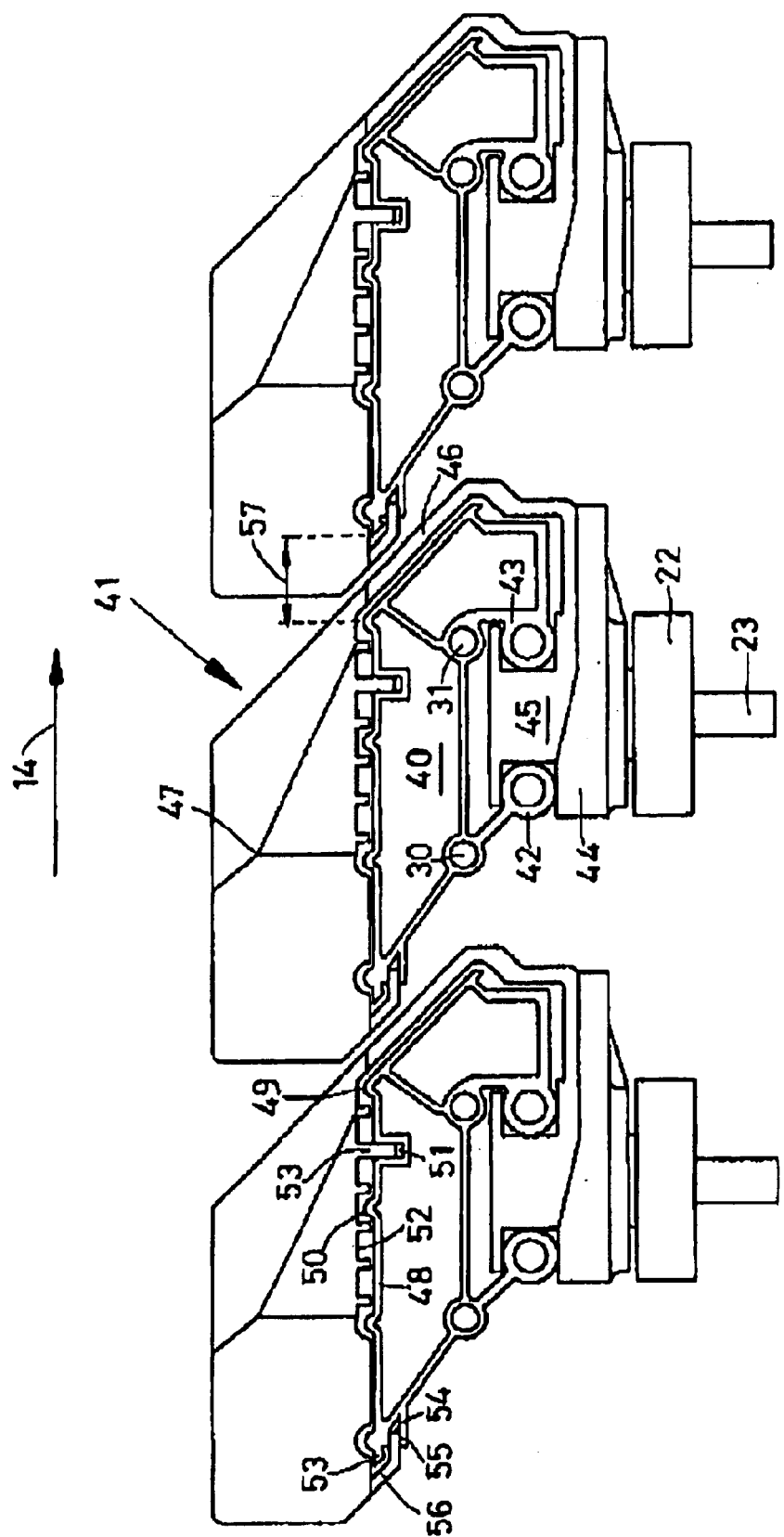
FIGS. 2a–2e show a first set of preferred applications of the support/push shoe combinations that may be used in a conveyor system based on the invention.
Figure 2B:
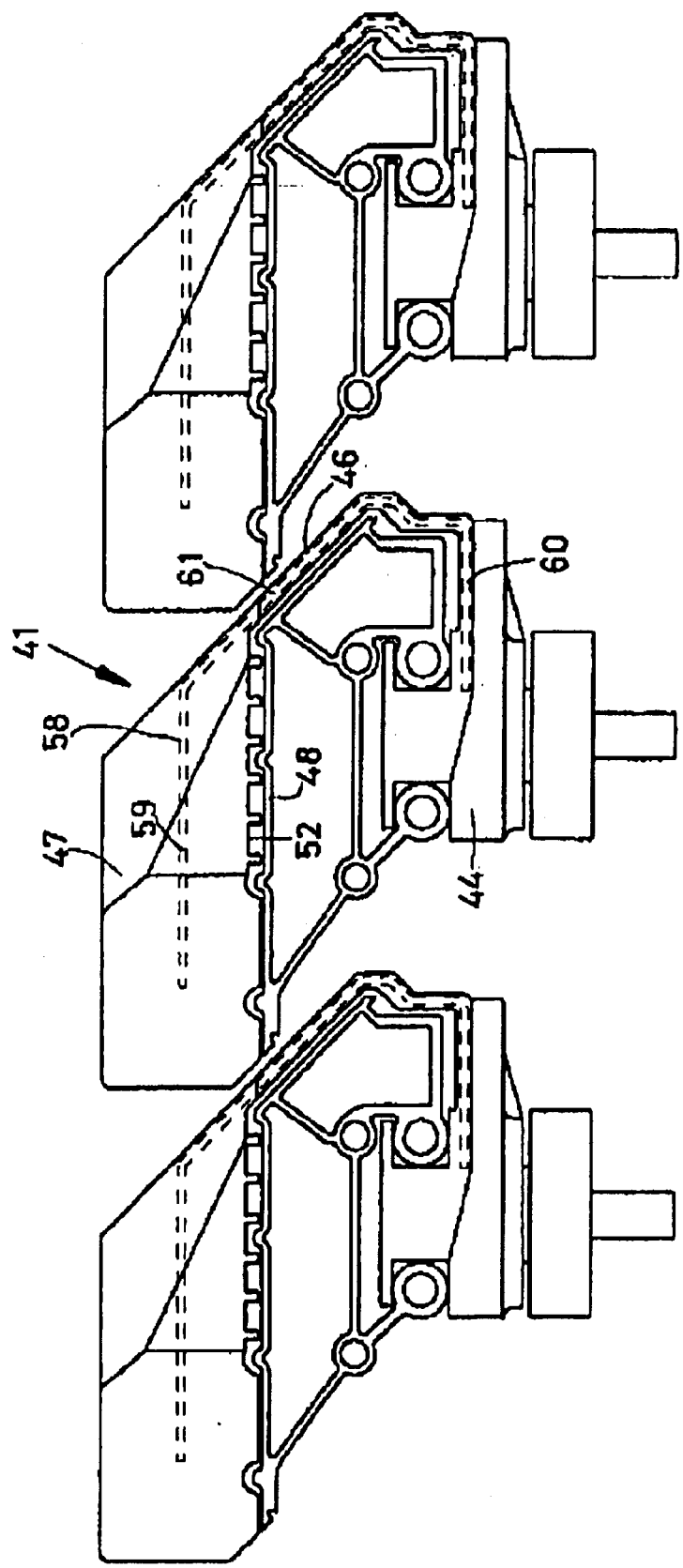

The firmness problems at the oblique, downward extending wall 46 have been resolved in a different way in the preferred application of FIG. 2b, eliminating the need for the additional guiding provisions, specifically for pushing unit 47, and having the bottom surface 52 correspond with the bottom surface 3 of pushing unit 7 in state of the art applications (FIG. 1).

The firmness problem has been resolved by using a stainless steel brace 58 that is primarily U-shaped. In addition, other metals may be used for brace 54, provided that they have the required mechanical strength values. A first leg 59 of the U-shape is extending parallel to bearing surface 48 in, if seen in vertical direction, the center of pushing unit 47, while the second leg 60 extends parallel to the first leg within base 44 of push shoe 41. Furthermore, it is not a strict requirement within the context of the invention that the first leg 59 and the second leg 60 extend parallel to one another, and/or that one of both legs 59, 60 extends parallel to bearing surface 48. Unit 61 of the U-shaped brace 58 connecting the first leg and the second leg extends alongside the oblique, downward extending wall 46. Because the firmness of stainless steel is better than the synthetic material used to manufacture the push shoes in state of the art applications, the change of position of pushing unit 47 with regard to base 44 will not be unacceptable. It is for example possible to pre-position brace 58 during the injection molding process of the part in synthetic material of push shoe 41 in the related mould thereby injecting it completely in the part in synthetic material of push shoe 41.

Figure 2C:
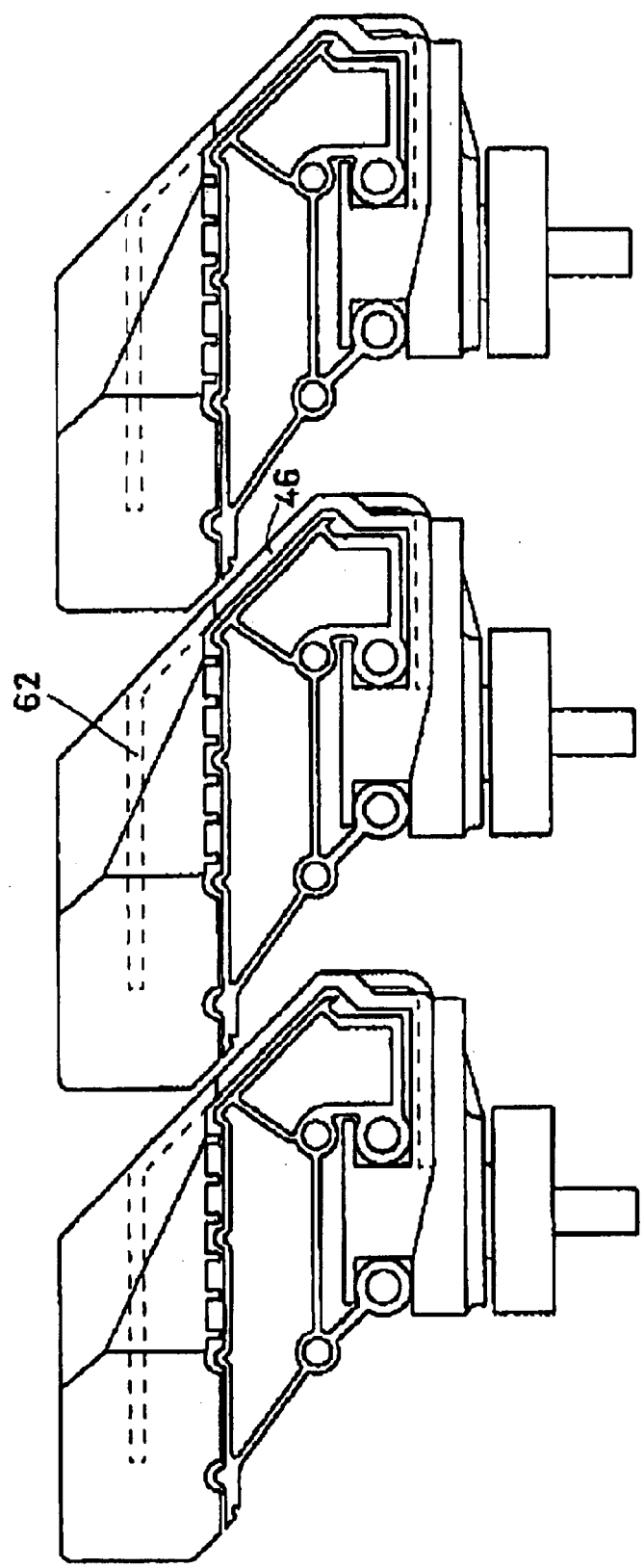

The application example of FIG. 2c is similar to the application of FIG. 2b, since there is also a brace, i.e. brace 62. Brace 62 is related to an extruded aluminum profile. Because the firmness is lower than in steel, the wall of brace 62 is thicker than the wall of brace 58 in FIG. 2b. This wall thickness corresponds to the thickness of the oblique, downward extending wall 46 thereby positioning brace 62 at the external surface.

Figure 2D:
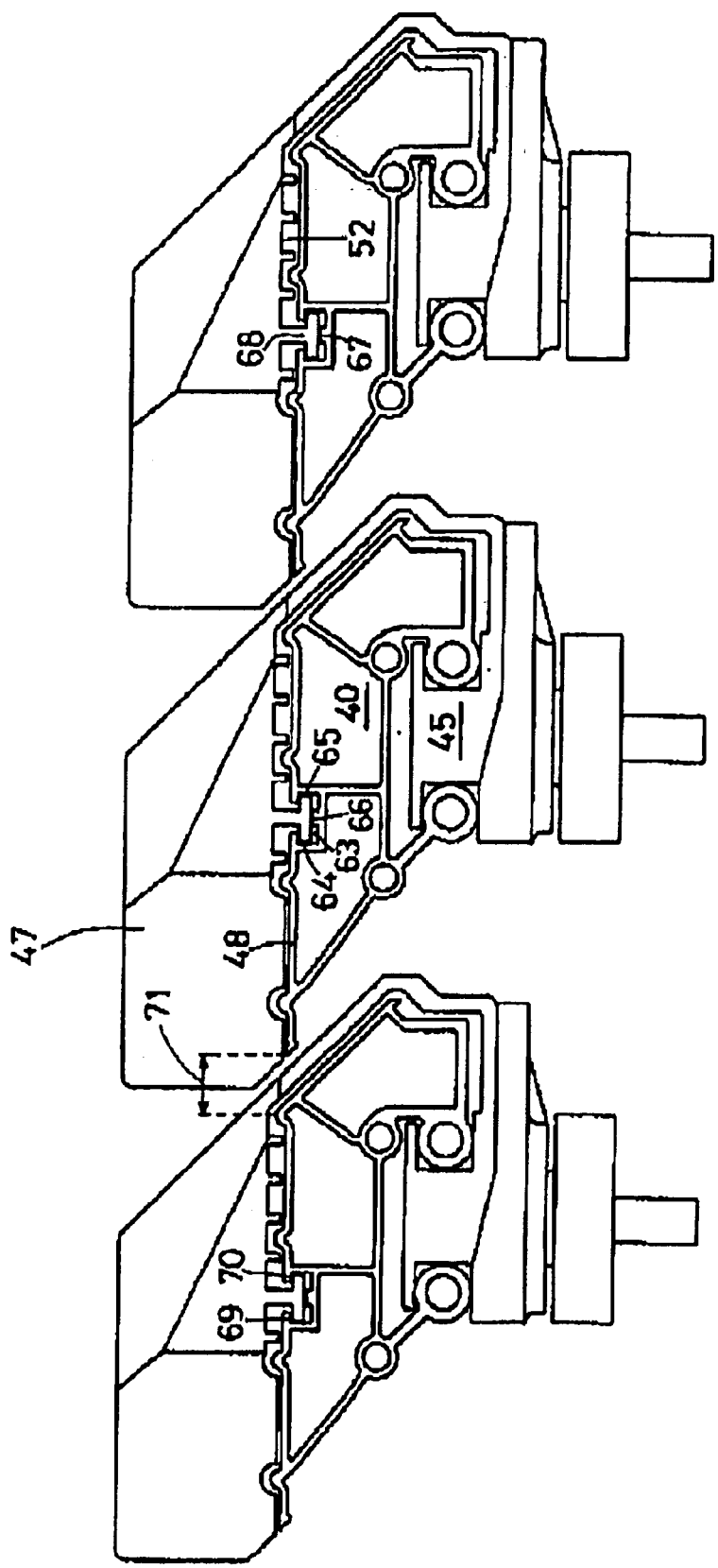

The application of FIG. 2d does not have a metal brace as is the case in the applications of FIGS. 2b and 2c, but has, exactly as the application of FIG. 2a, additional guiding provisions especially for pushing unit 47. Unlike the separate guiding provisions for vertical and horizontal retaining purposes in the application of FIG. 2a, these provisions in the application of FIG. 2d are linked to one another. For this reason, support 40 is provided directly under the bearing surface 48 with a guiding groove 63 partially surrounded by vertical guiding surfaces 64, 65, horizontal guiding surfaces 69, 70, and a horizontal guiding surface 66 at an upward oriented edge 67. From the bottom surface 52 of the pushing unit 47 extends an upside down T-shaped guiding profile 68 with the horizontal part of the T-shape having a guiding contact with the vertical guiding surfaces 64, 65 and the horizontal guiding surfaces 66, 69, 70 resulting in the fact that pushing unit 47 is separately, horizontally and vertically retained independently from push shoe 41 being vertically and horizontally retained by the T-shaped guiding profile 45. A major benefit of the application of FIG. 2d in comparison to the application of FIG. 2a is an even smaller crack width 71 because of the absence of guiding unit 56.

Figure 2E:
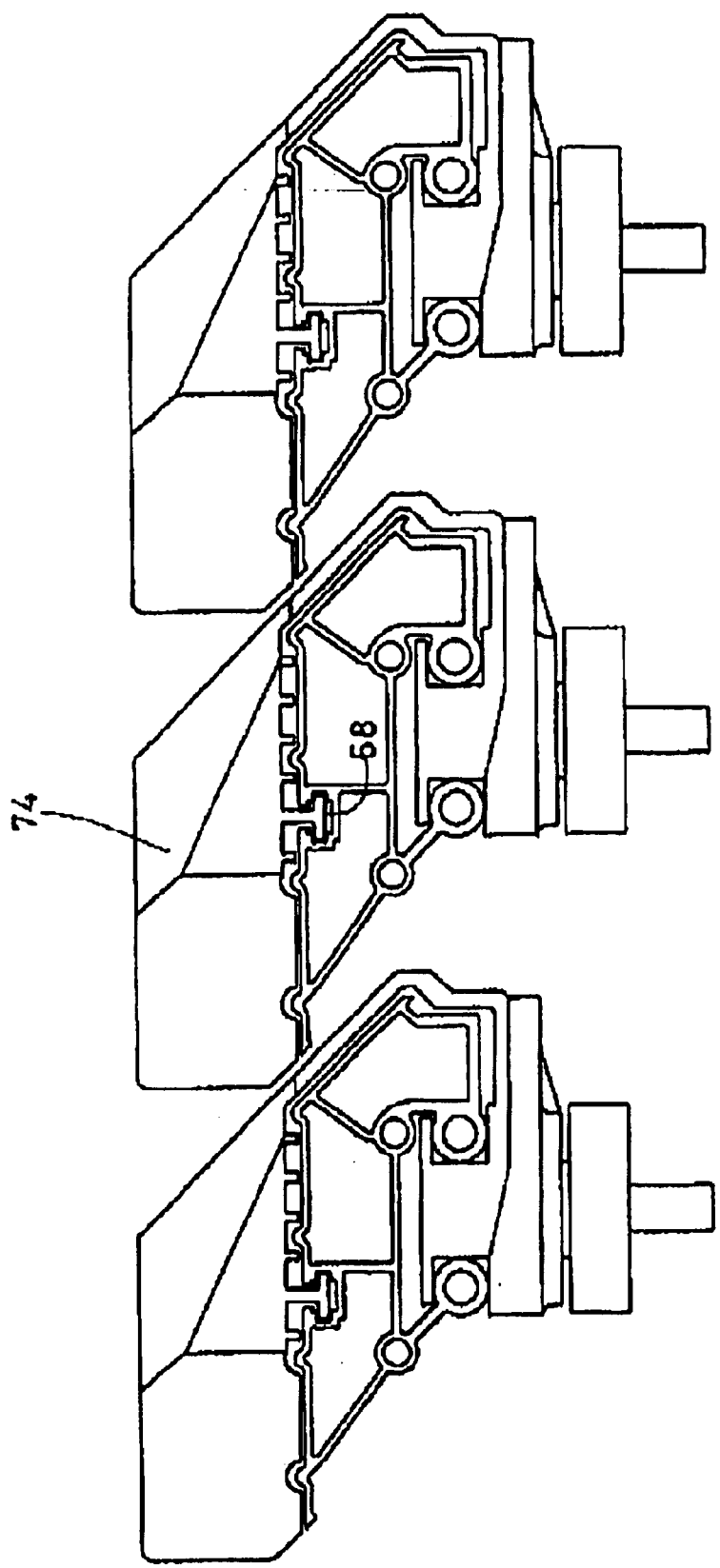

The only difference between the application of FIG. 2e and the application of FIG. 2d is the different shaping of guiding groove 68 and guiding groove 63, making the application useful for processing possibly leaking, liquid containing products. Pushing unit 47 is also retained vertically and horizontally.

Figure 3A:
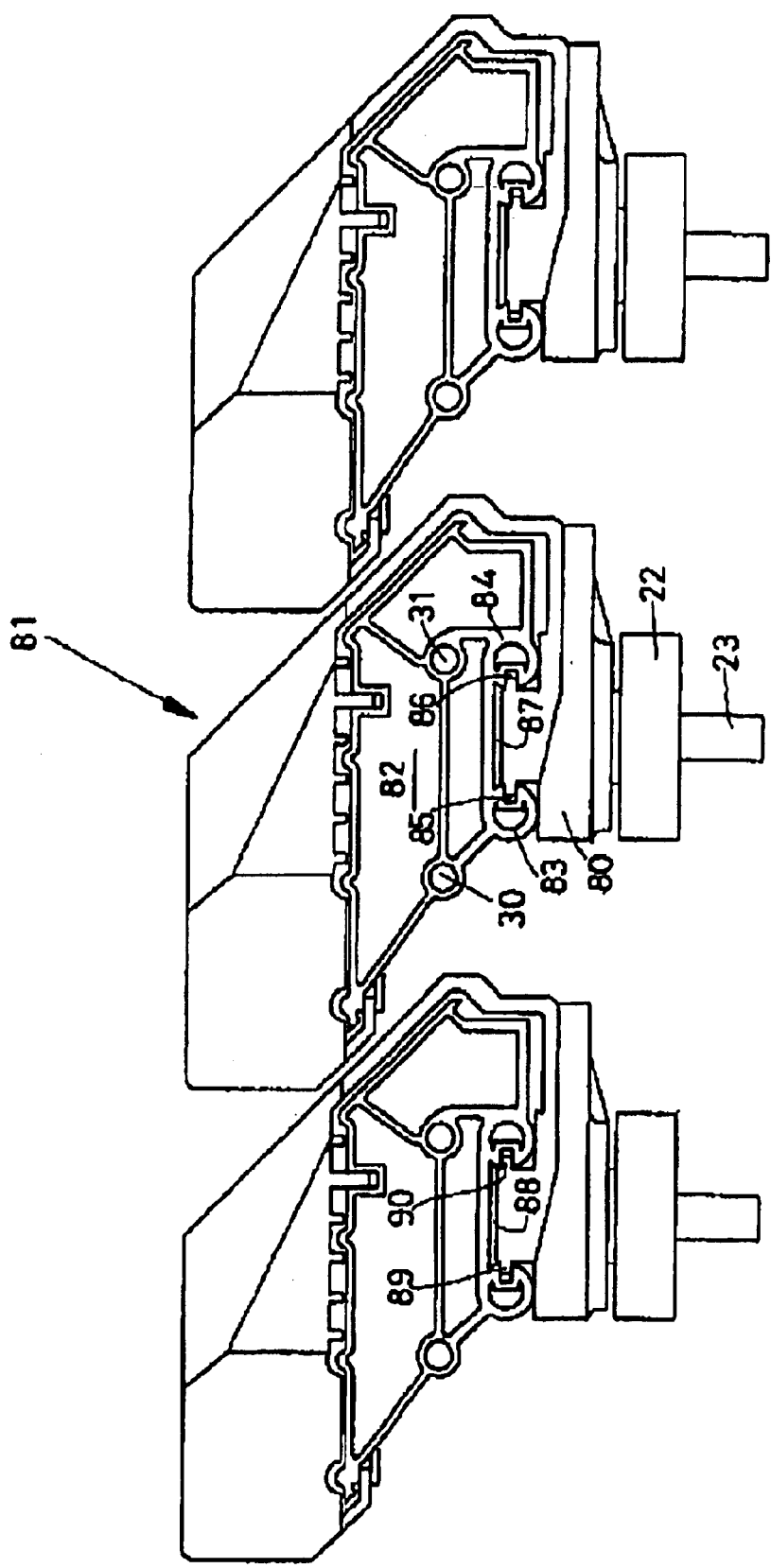
FIGS. 3a and 3b show a second set of preferred applications of the support/push shoe combinations that may be used in a conveyor system based on the invention.
Figure 3B:
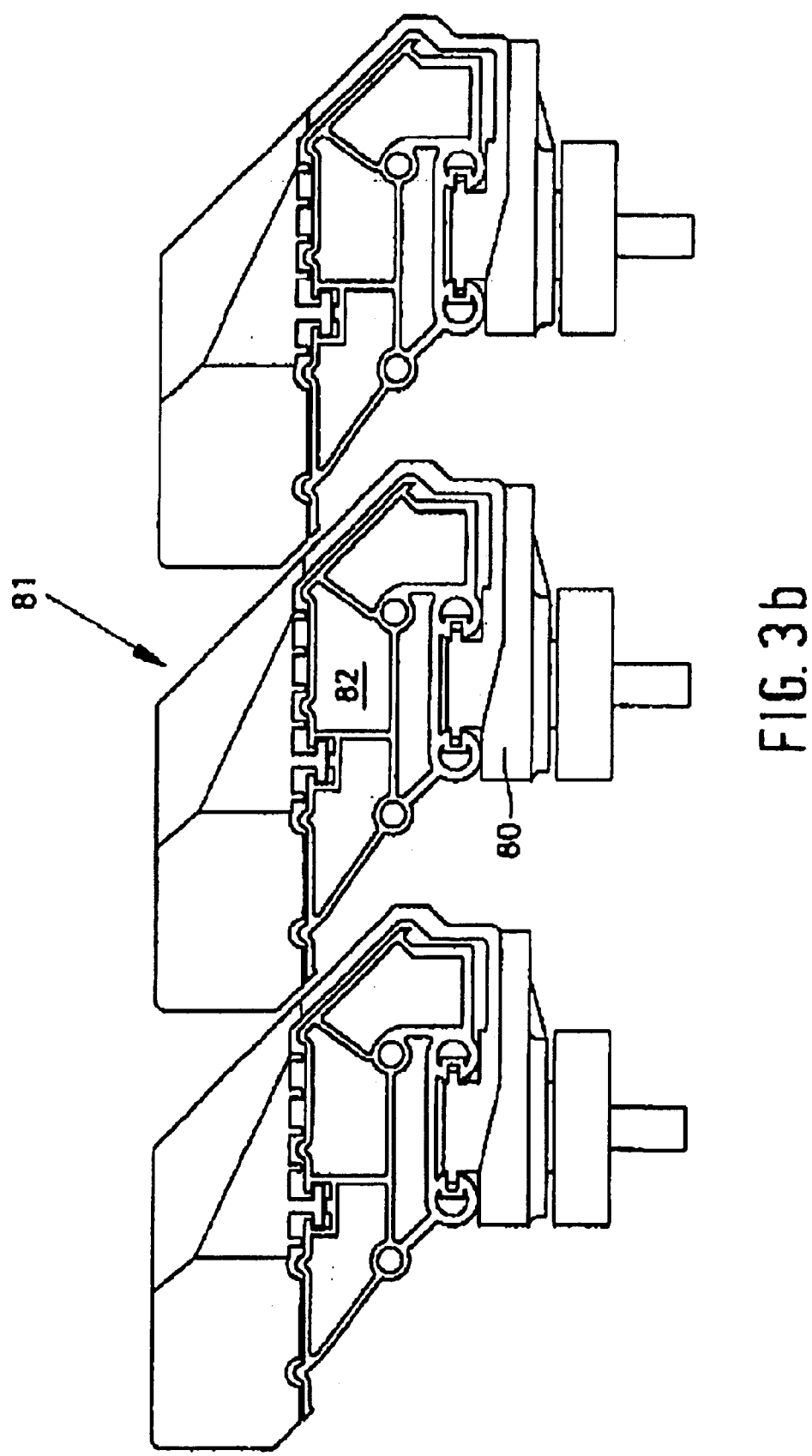

The differences between the applications of FIGS. 3a and 3b and the applications of FIGS. 2a and 2d is the method to shape the longitudinal guide of base 80 of push shoe 81 in synthetic material alongside support 82.

Support 82 is provided at the bottom side with two tubular parts 83, 84 provided at the external sides and the sides directed to each other with the guiding grooves 85, 86 directed to the center line of the related tubular parts 83, 84. Base 80 is provided with a guiding edge 87 extending between the two tubular parts 83, 84 thereby horizontally retaining at least base 80 of the push shoe 81 with regard to support 82. Directly under the top side 88 of guiding edge 87 are two horizontally directed sub-guiding edges 89, 90 ensuring that at least base 80 of push shoe 81 is vertically retained with regard to support 82 by interacting with the guiding grooves 85, 86.

Figure 4A:
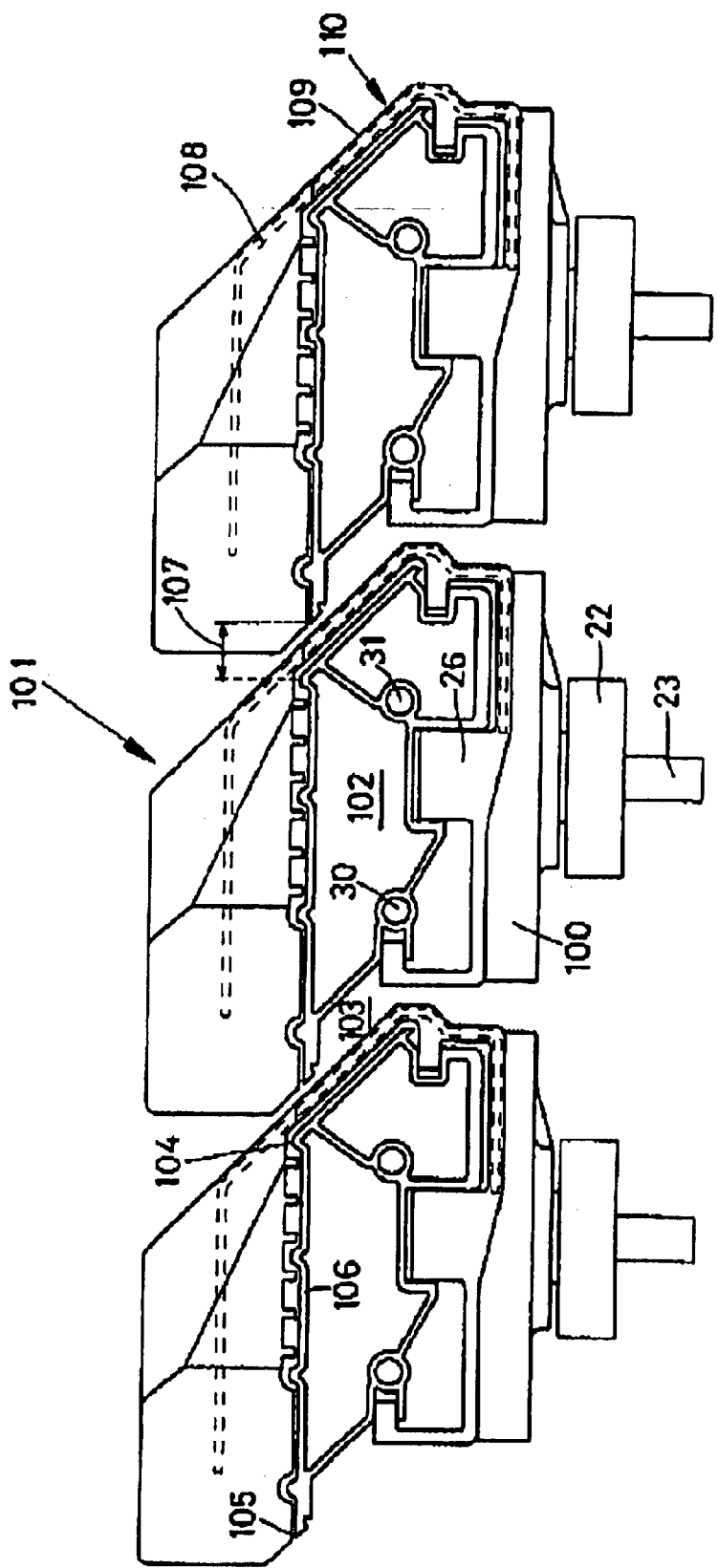
Figure 4C:
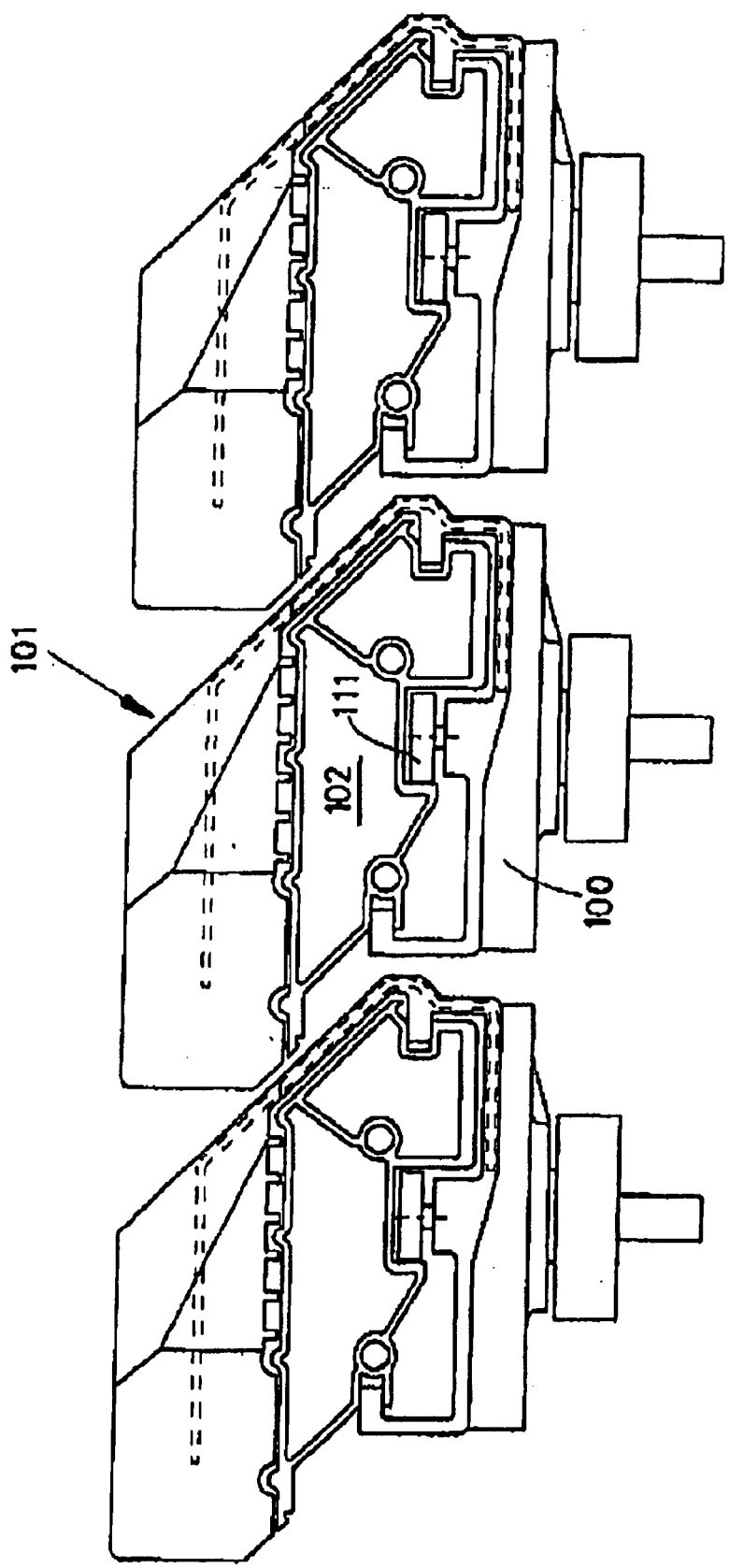

The applications shown in FIGS. 4a and 4c on one hand and 4b on the other hand are only different from the applications of FIGS. 2b and 2e in the way of shaping the guide of base 100 of the push shoe 101 in synthetic material with regard to support 102. The shape is basically identical to the shape in the state of the art application of FIG. 1, which has been described above and does not require any further details. However, it is noteworthy that push shoe 101 in the applications of FIGS. 4a and 4b is open, unlike push shoe 2 of FIG. 1 of the state of the art application, at the location of reference No. 103. As a result, the distance between the front top longitudinal edge 104 and the back top longitudinal edge 105, or the width of bearing surface 106, is substantially larger than the width of bearing surface 3 in the state of the art application. This evidently leads, with an unchanged pulling distance between two adjacent support/push shoe combinations, to a reduction of the distance 107 between the front top longitudinal edge 104 of a first push shoe 101 and the back top longitudinal edge 105 of a second push shoe 101 situated before the first push shoe, which is a positive point as explained in detail in above paragraphs.

Although brace 108 in FIG. 4a is entirely surrounded by synthetic material at the oblique, downward extending contour part 109 of the guiding unit 110, the alternative not to use a synthetic material (which does not substantially contribute to the firmness) is possible, resulting in the oblique, downward extending contour part 109 of the guiding unit 110 made only of the material of brace 108, resulting in turn in the fact that the oblique, downward extending contour part 109 of the guiding unit 110 may even be smaller with an even smaller crack width 107. The same modification can evidently be applied to the application of FIG. 2b, and as described below, to the applications of FIGS. 4c and 4f.

The difference between the application of FIG. 4c and the application of FIG. 4a is the replacement of guiding edge 26 by a guiding wheel 111 that is laid around a vertical axis and can be rotated with regard to base 100. The use of a rolling guiding wheel rather than a gliding guiding edge results in a more silent movement of push shoe 101 alongside support 102. This benefit also applies, as far as this aspect is concerned, if push shoe 101 completely encloses support 102 in a state of the art application. Such application is shown in FIG. 4d.

Figure 4D:
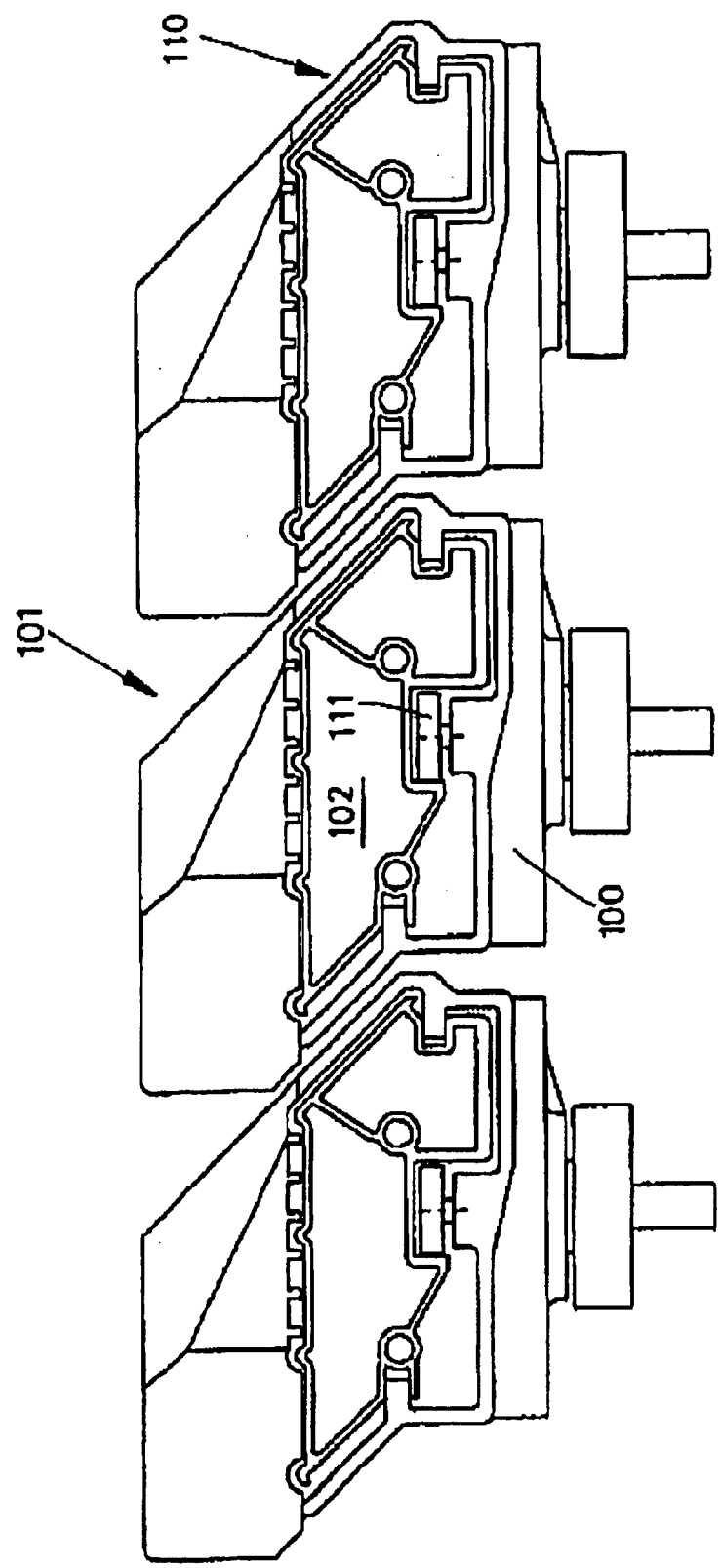
Figure 4E:
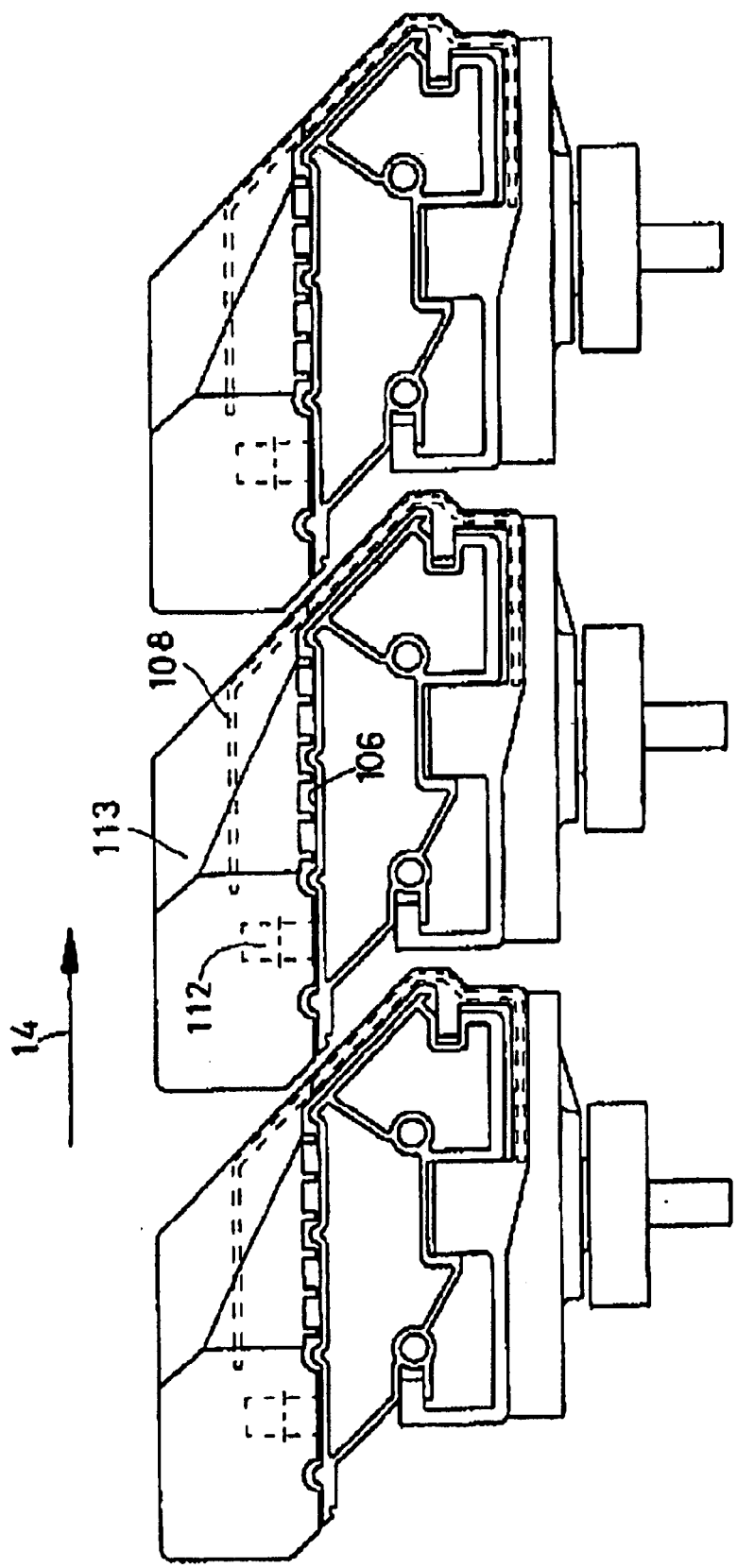
Figure 4F:
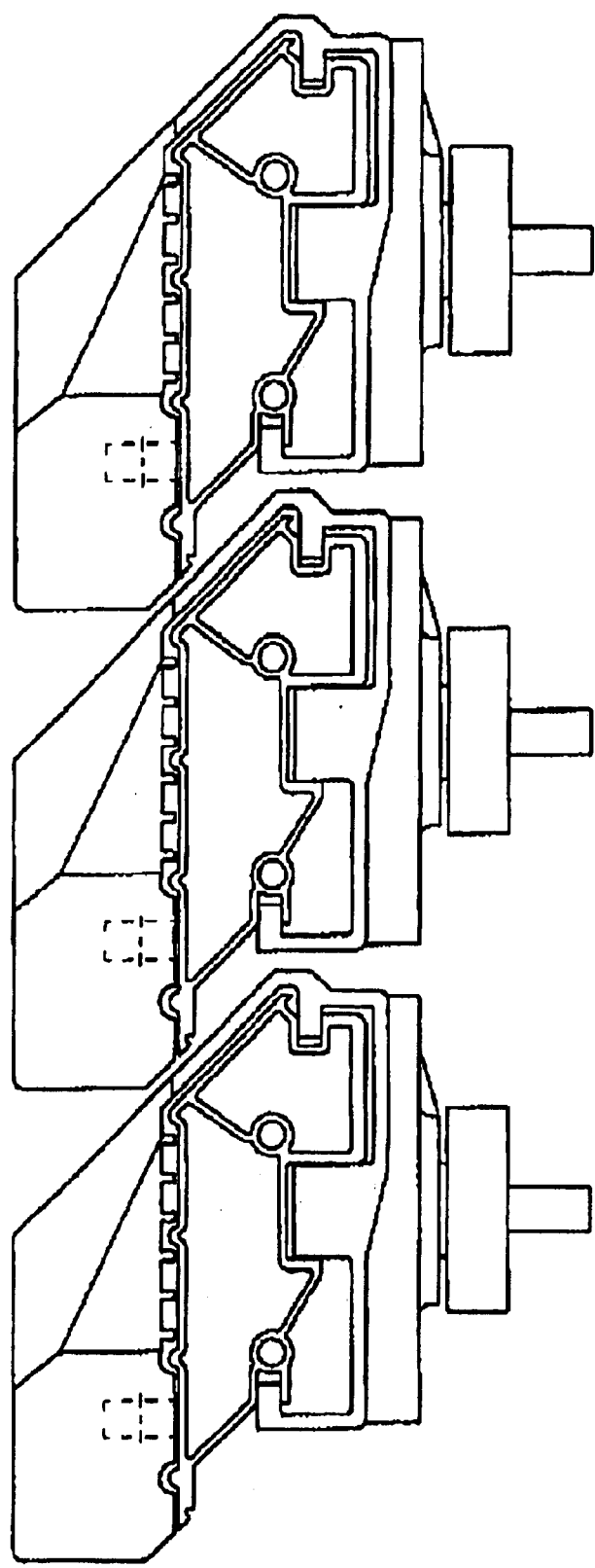

The difference between the application of FIG. 4e and the application of FIG. 4a is the addition of a guiding wheel 112 that can be rotated with regard to pushing unit 113, and is laid around a horizontal axis extending parallel to the moving direction 14. The guiding wheel 112 is almost completely housed inside pushing unit 113 and ensures additional support for the pushing unit 113 to prevent gliding contact between the bearing surface 106 and the pushing unit 113. Depending on the mechanical stress exercised on the push shoe in an operating environment, the alternative would be not to use brace 108, as shown in the application of FIG. 4f.

Figure 4G:
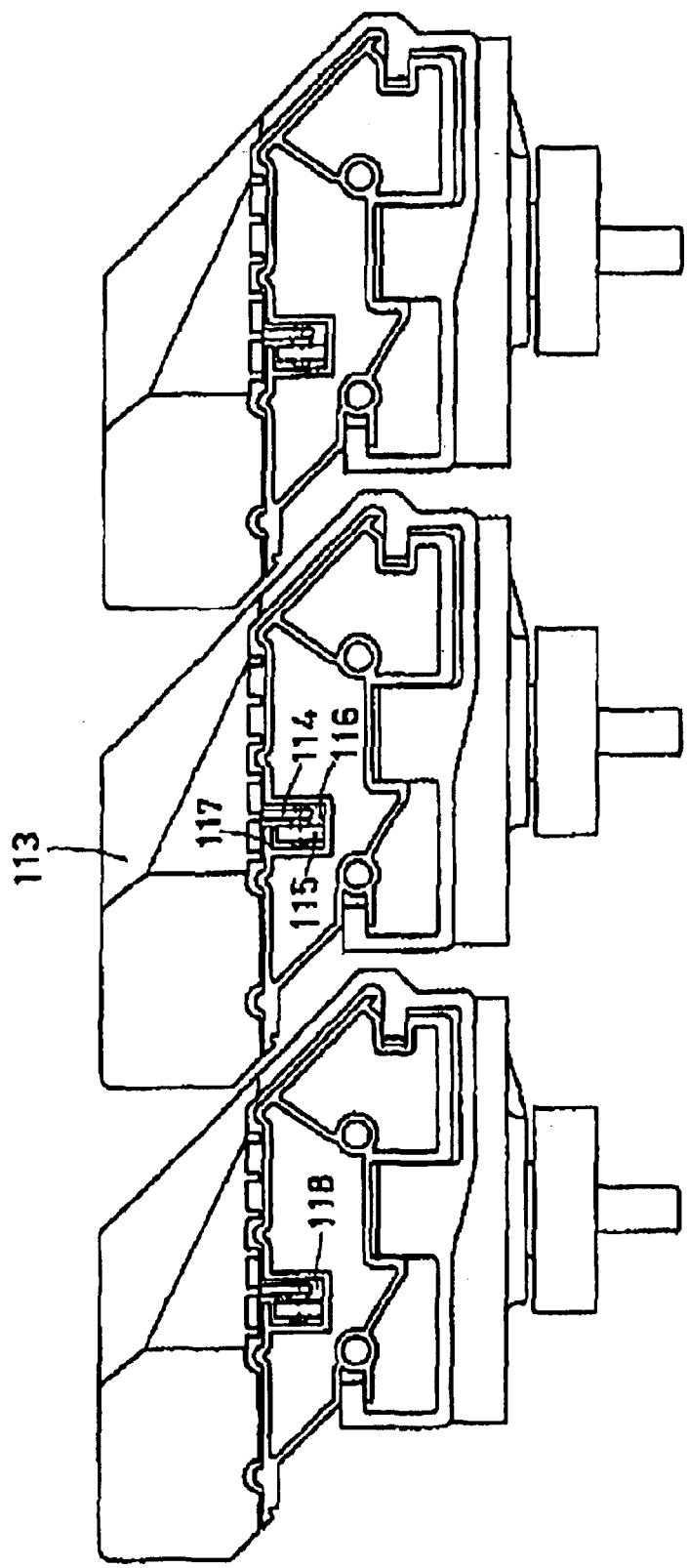

The application of FIG. 4g is very similar to the application of FIG. 4b. The function of the upside down T-shaped guiding profile 68 combined with guiding groove 63 is at least partially assumed by an arm 114 extending downward from the bottom side of the pushing body 113. A guiding wheel 115 is laid near the end of the arm. The guiding wheel can be rotated around a horizontal axis and has a rolling contact with one of the inward oriented sides 116, 117 of a guiding space 118 located under a bearing surface 106. This means that the pushing unit 113 is retained in two opposite vertical directions.

Figure 4H:
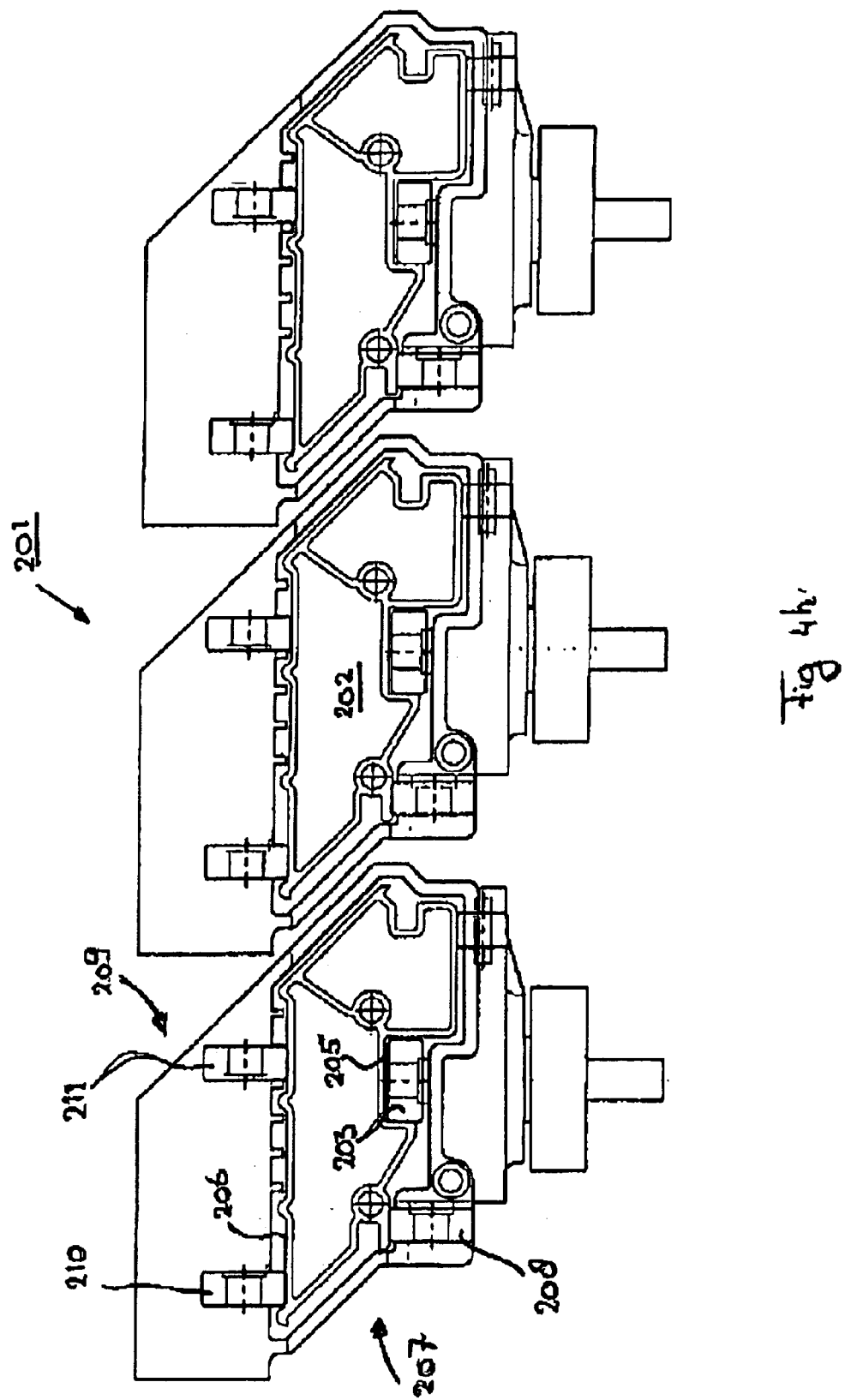
Figure 4I:
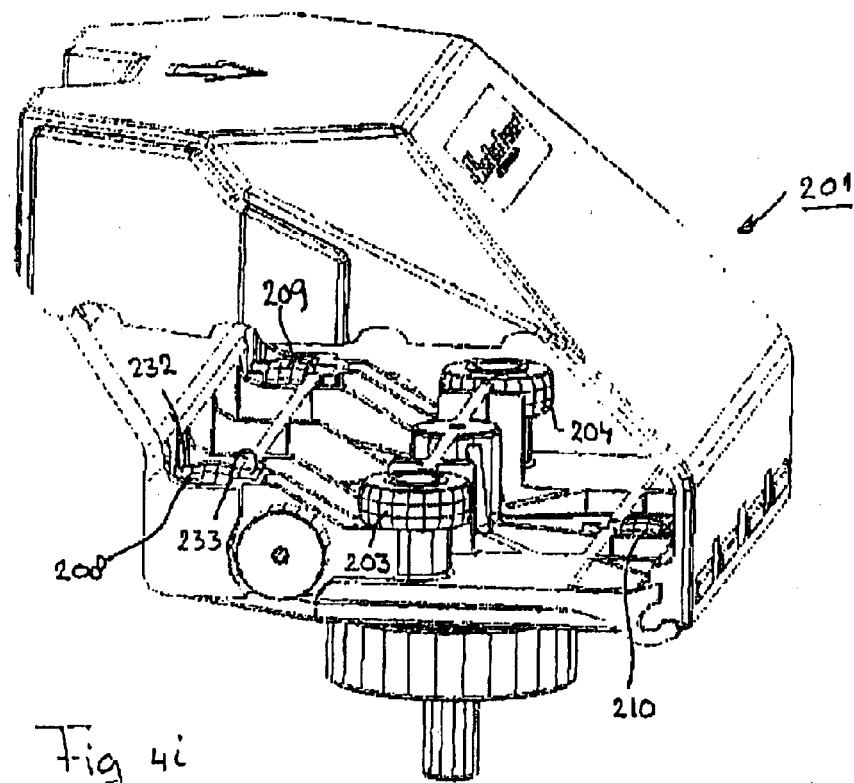
FIGS. 4i and 4j show the design based on FIG. 4h in perspective views respectively closed and open.
Figure 4J:
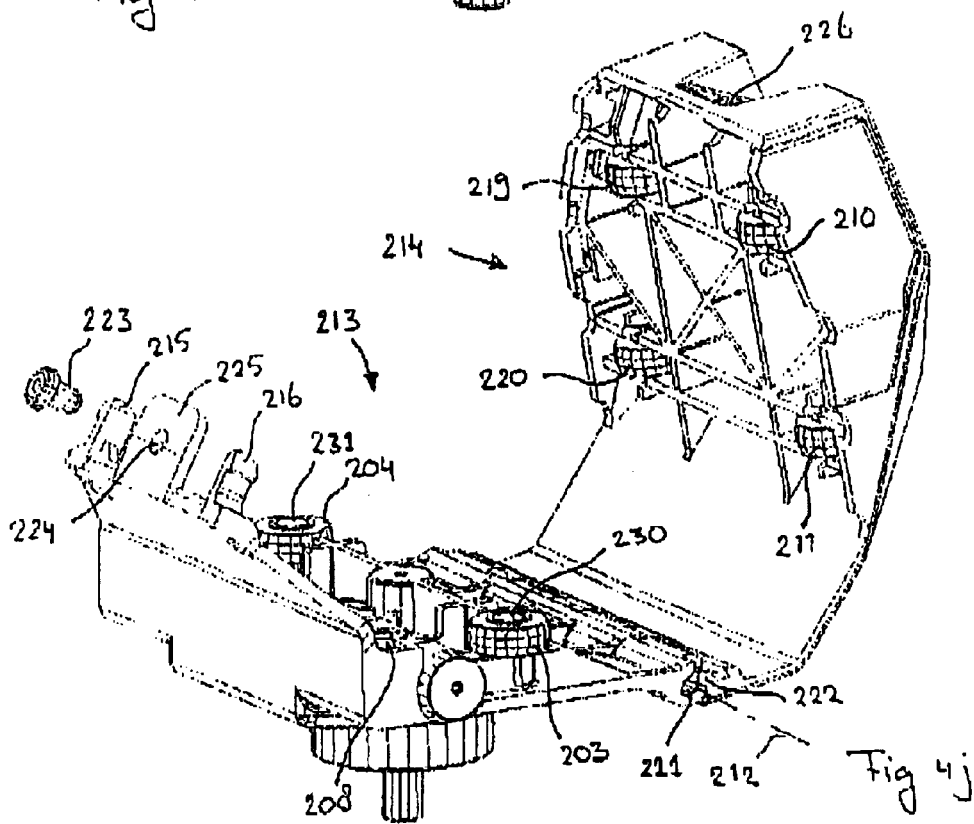

The applications shown in FIGS. 4h–4j may be seen as variants of the application shown in FIG. 4d. However, while the application of FIG. 4d is partially designed with a gliding guide and partially with a rolling guide between push shoe 101 and support 102, the applications shown in FIGS. 4h–4j are designed only with a rolling guide between push shoe 201 and support 202. For this purpose, the push shoe is provided with nine rolling wheels. The first rolling wheels are wheels 203, 204 positioned behind each other in longitudinal direction, and included with limited play in a U-shaped guiding channel 205 for rolling contact with one of both legs of the U-shape of the guiding channel. The rotation axis units 230, 231 for rolling wheels 203, 204 are extending perpendicularly on bearing surface 206, and their ends are clamped in cylindrical recesses directly under the rolling wheels 203, 204. Sleeve bearings have been installed for the rotation of rolling wheels 203, 204 around the rotation axis units 230, 231. In addition, the guiding unit 207 of push shoe 101 is also provided with metal rolling wheels 208, 209, and 210, with rolling wheels 208 and 209 positioned behind each other in longitudinal direction. Rolling wheels 208, 209, 210 roll against the horizontally oriented bottom sides of support 202, for which reason they have rotation axis units extending in conveying direction.
Each such axis unit is clamped at both ends between the two legs of the U-shaped recesses. FIG. 4j shows both recesses related to the axis unit for rolling wheel 208, with the reference Nos. 232 and 233. Finally four rolling wheels 210, 211, 219, 220 are installed in the pushing unit 209 of push shoe 201, and can be rotated around the rotation axes extending in conveying direction. These rolling wheels 210, 211, 219, 220 maintain at their bottom sides a rolling contact with bearing surface 206. Rolling wheels 210, 211, 219, 220 are attached to push shoe 201 in a similar fashion as the attachment of rolling wheels 208, 209, 210 to push shoe 201. Because of the installation of nine rolling wheels, there is no gliding guide activity between push shoe 201 and support 202, only rolling guide activity.

As shown in FIG. 4j, push shoe 201 is constructed with two main components 213, 214 that are inter-hinged around hinge shaft 212. For hinging purposes, main component 213 is provided with an integral hub part 221 for inclusion of axis part 222, which in turn is an integral part of main component 214. The provisions for hinging purposes are not shown in FIG. 4h. Main components 213, 214 can be easily disconnected at the location of hinge shaft 232. In the position where the main components 213 and 214 hinge toward each other, as shown in FIG. 4j, joints 215, 216 of main component 213 snap and grip in recesses 217, 218 respectively thereby creating a closed passage for support 202, as shown in FIG. 4j. To add to the locking activity in the position shown in FIG. 4j, a locking pin could be inserted through a hole 224 in joint 225 of main component 213, and through a hole 226 of main component 214, which is in line with hole 24 [sic].

The axis units, specifically axis units 230, 231 each with a free end, may be connected to a push shoe in an alternative way by making the axis units from a synthetic material and making them integral parts of the adjacent part of the push shoe by using an appropriate injection mould.

It is recommended for such application to use roller bearings rather than sleeve bearings for the rotation of a rolling wheel around the related axis unit.

The support for a push shoe 120 in the application shown in FIG. 5a consists of two parallel support components 121, 122 with a passage between them for the connecting part 123 of push shoe 120. Connecting part 123 connects pushing unit 124 with the part of push shoe 120 located under the support parts 121, 122, which part also contains guiding wheel 22 and guiding pin 23. Unlike other applications of the invention described above, this connection is not realized along the oblique, downward extending wall 125 of push shoe 120. In view of the more robust make and the dimensions of connecting part 123, there is no need for separate guiding provisions specifically for pushing unit 124. Push shoe 120 is locked in horizontal direction with regard to support parts 121, 122 through interaction of the sides of connection part 123 that are oriented to the support parts 121, 122 on one hand, and the sides of the support parts 121, 122 that are oriented toward connection part 123 on the other hand. To vertically lock push shoe 120 with regard to the support parts 121, 122, all sides of the support parts 121, 122 that are directed to each other, are provided with a guiding groove, i.e. 126, 127 respectively, in which grooves outward extending and horizontally oriented guiding edges 128, 129 are constructed to be an integral part of connection part 123.

Figure 5B:
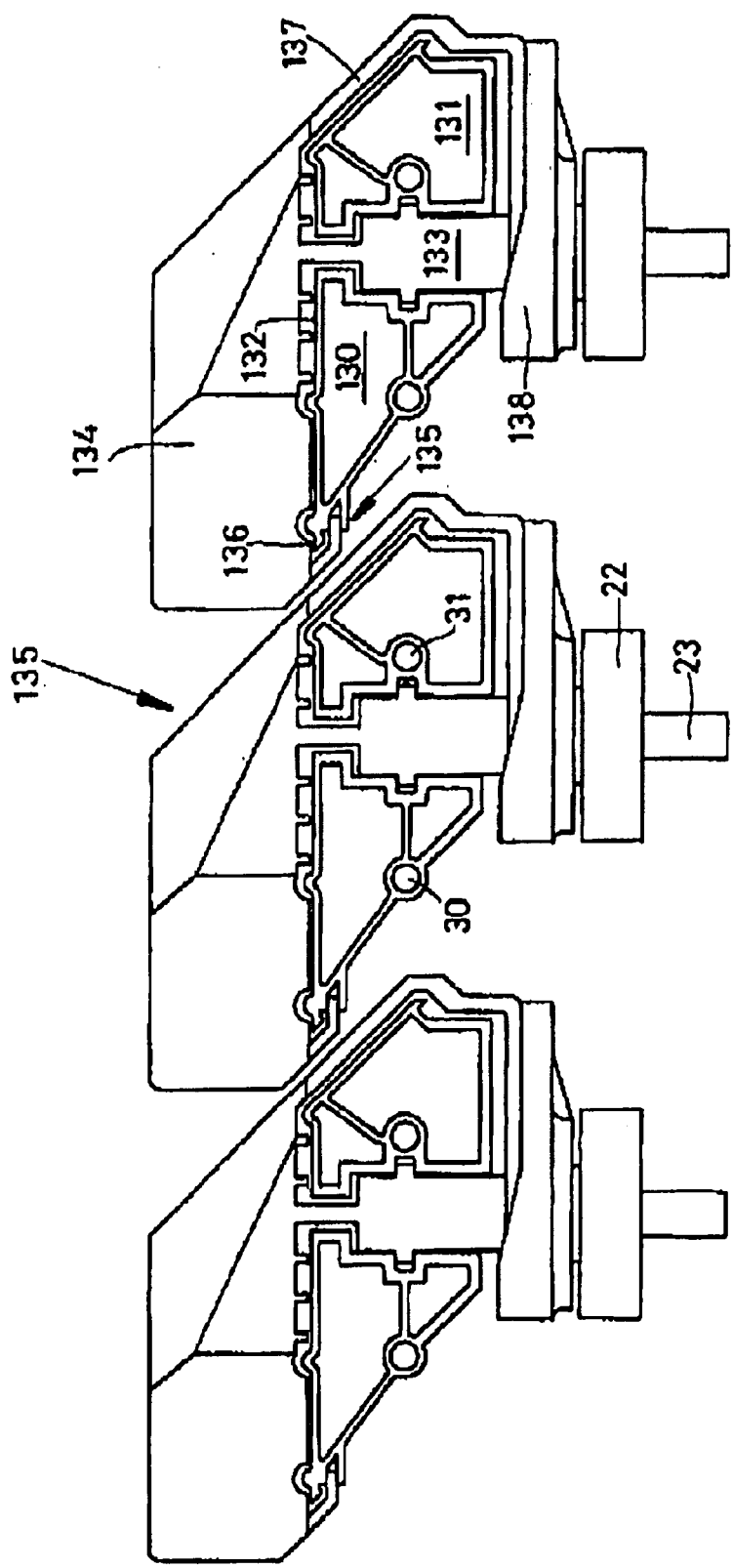

It is noted for the application of FIG. 5a that the width of the passage between the support parts 121, 122 could have adverse effects. A solution to this problem is offered by the application of FIG. 5b, in which the width of the passage between support parts 130, 131 at the level of bearing surface 132 is smaller than in the lower part of the passage between support parts 130 and 131.

Evidently, also the connecting part 133 has smaller dimensions at the level of bearing surface 132. This basically creates the risk that the position of pushing unit 134 with regard to the part of push shoe 135 under support parts 130 and 131 is moved in an unacceptable way by the external mechanical stress causing deformation to the connection part at the level of the bearing surface 132. A first measure to prevent this situation from occurring consists of installing guide 135 at the back top longitudinal edge 136 of support part 130. Said guide 135 has been explained in FIG. 2a. The guide 135, together with the guides related to connection part 133, as explained for FIG. 5a, ensure that pushing unit 134 is properly locked in vertical direction. To lock pushing unit 134 in horizontal direction, the oblique, downward wall 137 is connected to connection part 133 alongside base 138 ensuring enhanced inherent structural firmness.

To even better lock pushing unit 134 and replace guide 135, the application of FIG. 5c uses guide 139 of the type explained in FIG. 2d.

The support in the applications of FIGS. 6a and 6b also actually consists of two support components, i.e. extruded aluminum support profile part 150 and support bar part 151. Support profile part 150 and support bar part 151 are interconnected through coupling plates (not shown) for which connecting holes 30, 31 have been provided. The support profile part 150 has a waving bearing surface 152, although bearing surface 152 can be seen as being substantially flat. As an alternative, a bearing surface similar to the bearing surface 3 in the application of FIG. 1 may be used. The guiding unit 153 of push shoe 159 is related to an aluminum extruded profile part containing a tubular part 154 at the location of the support bar part 151, and provided at the location of the guiding edge 155 of the support profile part 150 with a U-shaped end 156. The guiding unit 153 is provided at the location of the tubular part 154 with a tubular sleeve bearing 157 made of a synthetic material, and at the location of the U-shaped end 156 with a U-shaped sleeve bearing 158 made of a synthetic material. The sleeve bearings 157, 158 prevent any direct contact between the guiding unit 153 on one hand and the supporting profile part 150 or the support bar part 151 on the other hand. Such contact is to be avoided since said parts are made from the same type of metal causing substantial wear and tear if the sleeve bearings 157, 158 would not be used. It must be noted that support bar part 151 serves as a guide locking push shoe 159 both in horizontal and in vertical direction, while guiding edge 155 only locks in vertical direction, but prevents push shoe 159 from rotating around support bar part 151. No separate guides specifically for pushing unit 160 of push shoe 159 have been provided. However, guiding unit 153 serves partially as a brace extending parallel to bearing surface 152 within the pushing unit 160. The part of this brace extending within the pushing unit 160 is indicated with a dash line 161 in FIGS. 6a and 6b showing that the brace in the application of FIG. 6a extends at the bottom side of pushing unit 160, while the brace in the application of FIG. 6b extends in the center of pushing unit 160. The synthetic material used to manufacture push shoe 160 is connected to brace 161 by means such as a snap connection (not shown). It is also possible within the context of the invention to inject brace 161 during the injection molding process of push shoe 159.

Figure 7A:
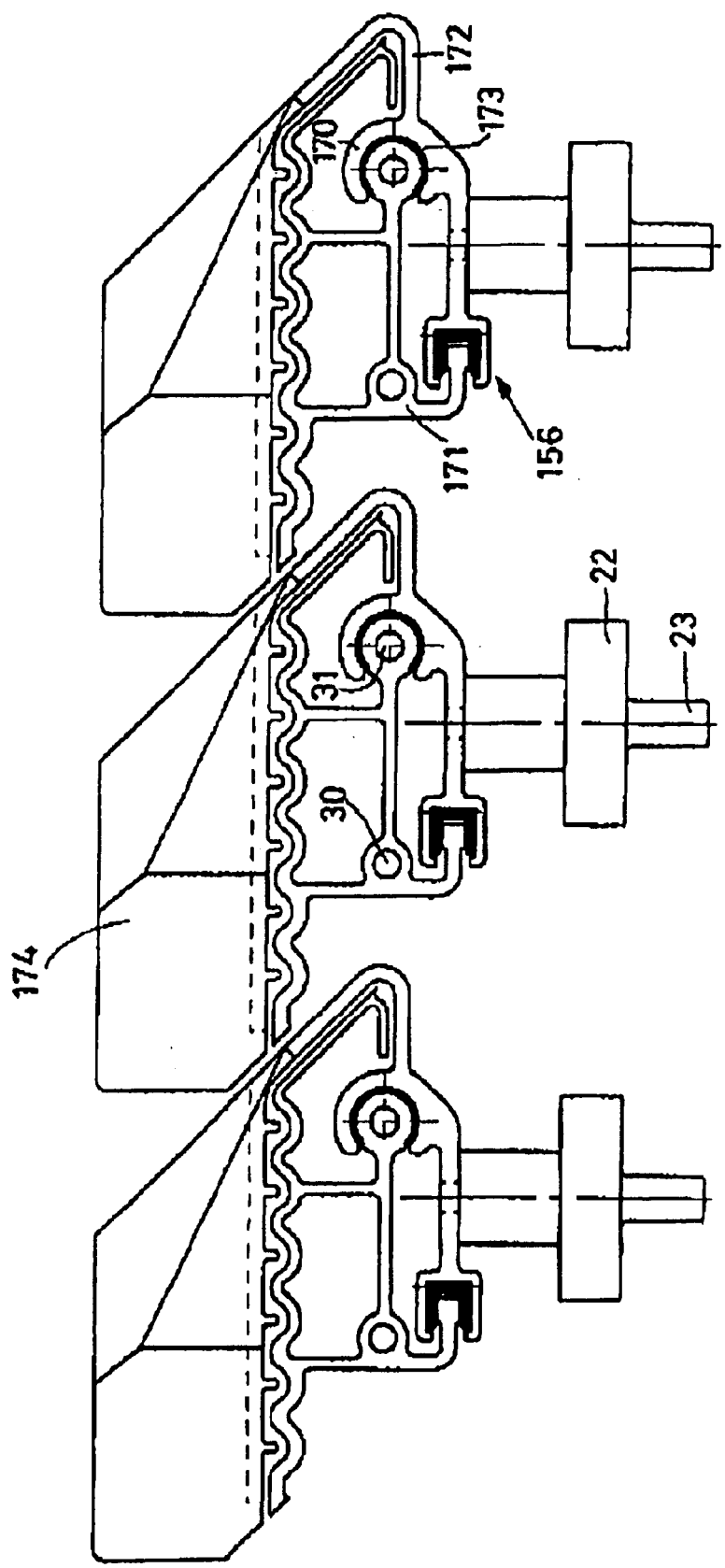

The application shown in FIG. 7a has many similar features as the application shown in FIG. 6a. The main difference between both applications is the replacement of the support bar part 151 by a tubular guide 170 as an integral part of support 171.

The shape of guiding unit 172 is adjusted accordingly at the location of tubular guide 170. The tubular sleeve bearing in synthetic material 157 has been replaced between guiding unit 172 and tubular guide 170 by providing guiding unit 172 with a C-shaped sleeve bearing 173 made from a synthetic material.

Figure 7B:
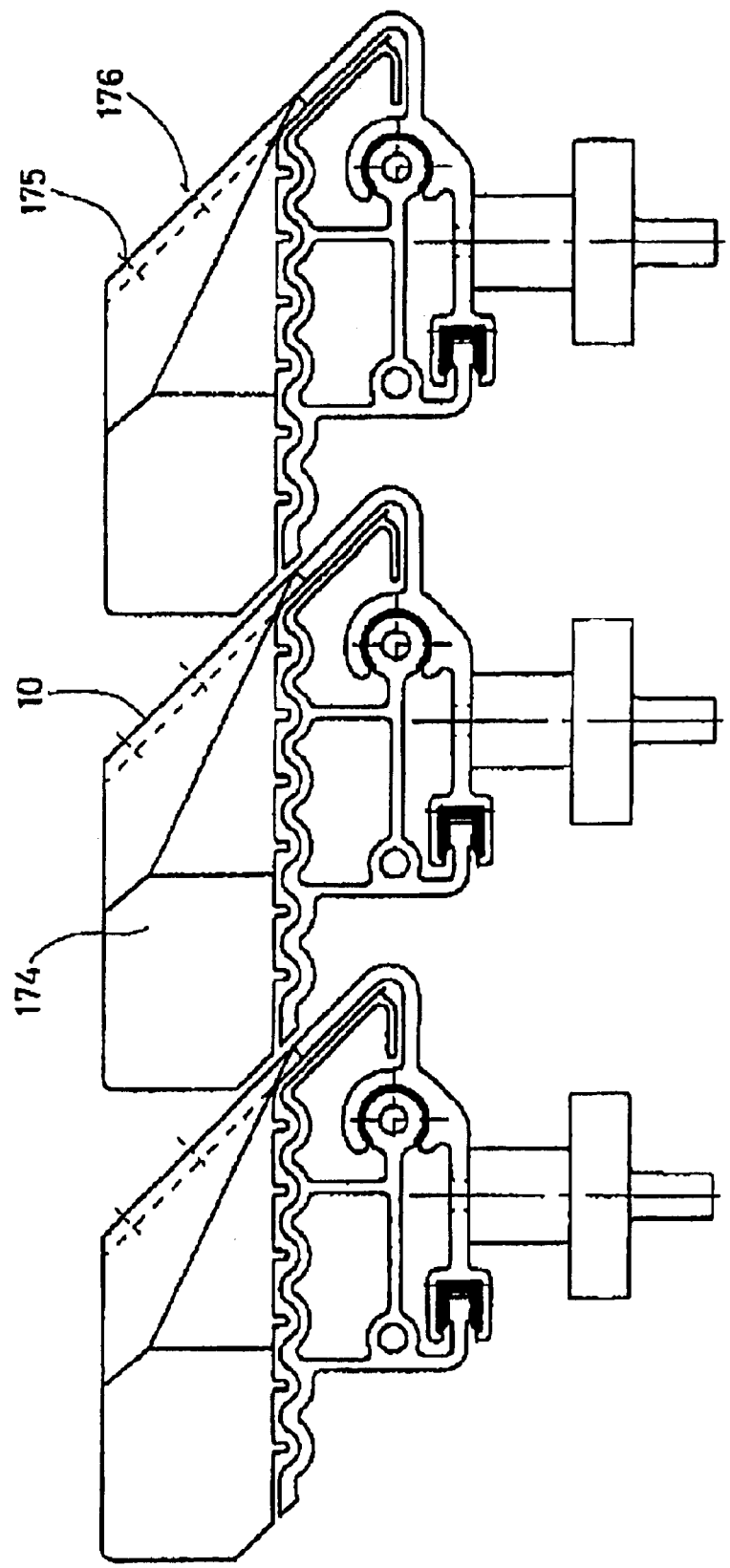
Figure 7C:
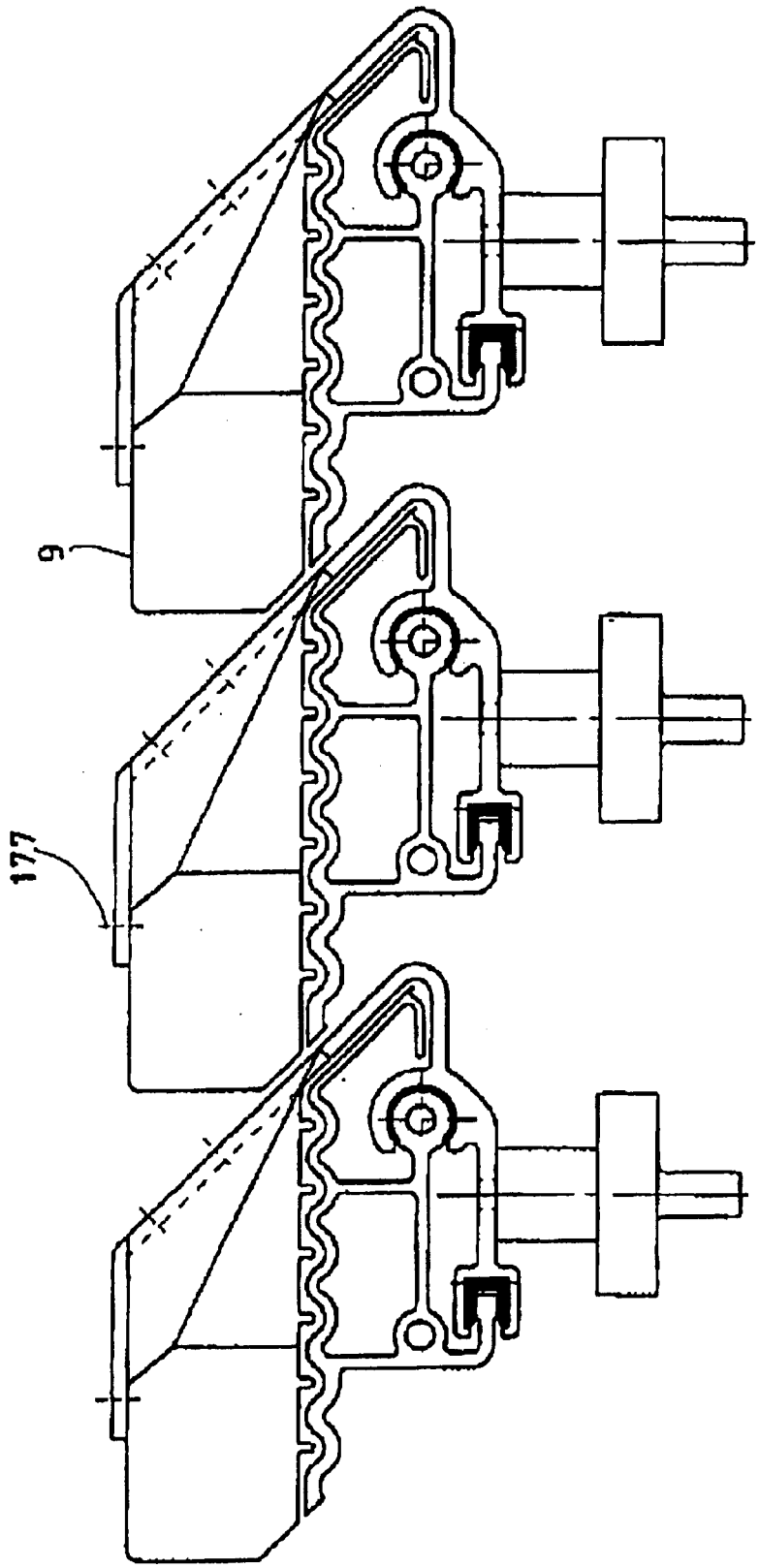
Figure 7I:
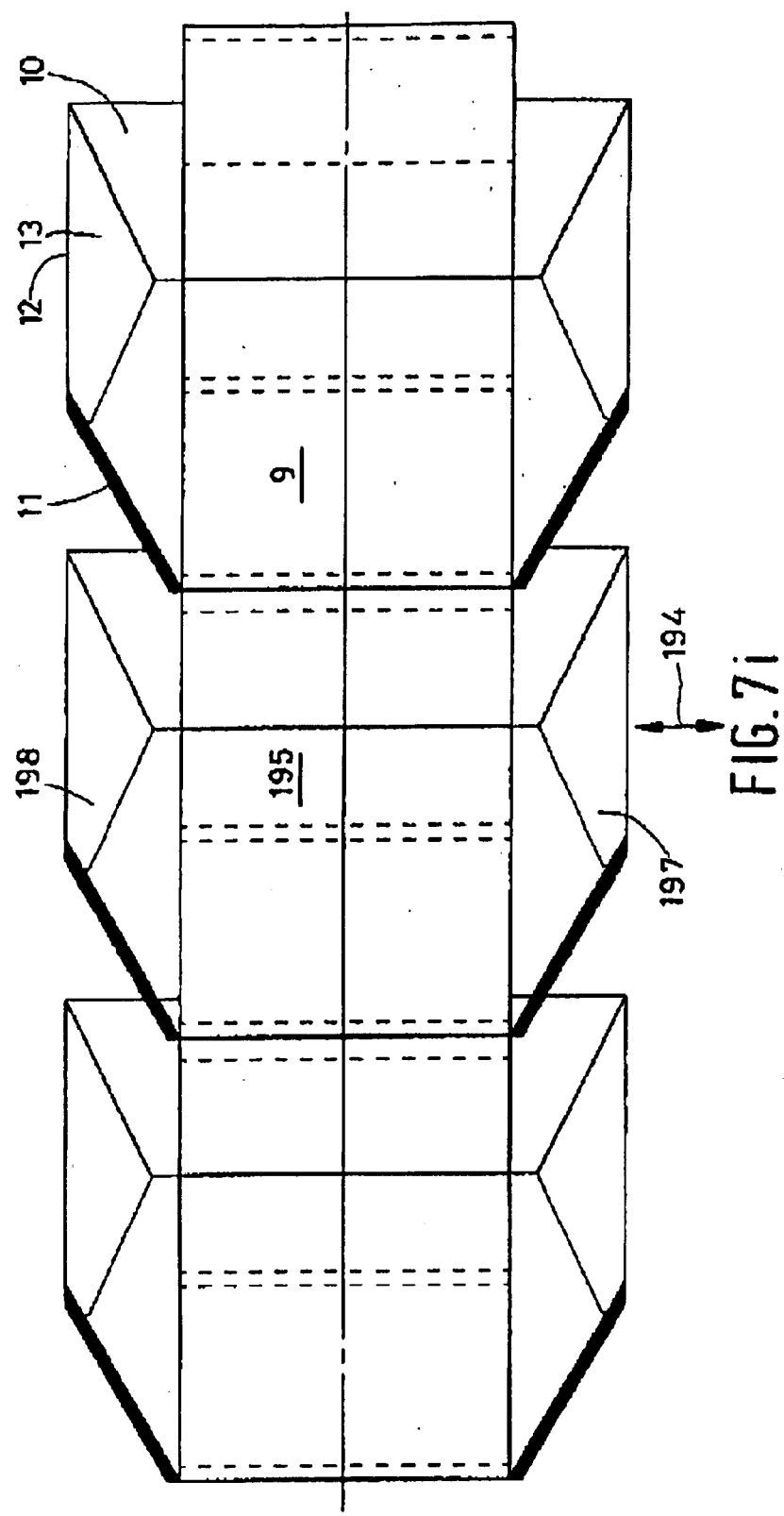
Figure 7K:
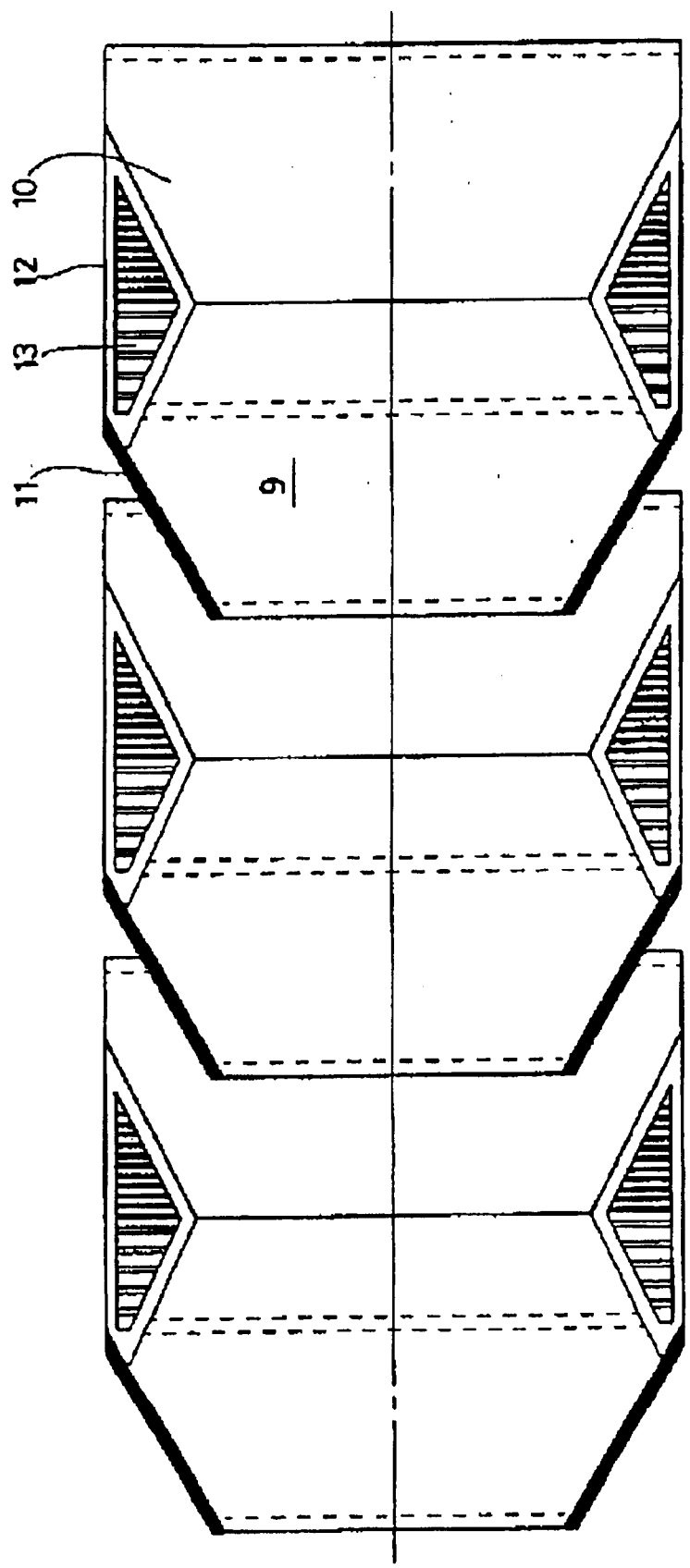

As shown in FIGS. 7b and 7c, there are alternatives available for the reduction means used for the part of the brace extending within the pushing unit 174. FIG. 7b shows the brace extending alongside the front surface 10 of the pushing unit 174. The part in synthetic material of pushing unit 174 is connected with the brace by means of countersunk screws 175, 176. As shown in FIG. 7c, to further enhance the firmness, the brace may further extend directly above top surface 9 of the pushing unit 174 where a countersunk screw connection 177 will also be used. The difference between the application shown in FIG. 7d and the application shown in FIG. 7a is the replacement of guide 156 by a guide with a guiding wheel 178 laid around a horizontal axis with regard to a standing leg 179 of the guiding unit 180. The guiding wheel 178 is locked, if seen in vertical direction, between two horizontal guiding edges 181, 182 of support 183. More stability is provided if two or more guiding wheels, such as guiding wheel 178, are installed between the two horizontal guiding edges 181, 182, which guiding wheels are positioned behind each other, perpendicular to the plane of the drawing, in the longitudinal direction of support 171.

Guide 156 of the application shown in FIG. 7a has been replaced in the application shown in FIG. 7e by a second tubular guide 183. To co-ordinate the guiding activity with such second tubular guide 183, the guiding unit 184 has been provided with a C-shaped part 185 partially locking tubular guide 183.

Tubular guide 183 is located concentrically with regard to connection hole 30, exactly as the concentric position of tubular guide 170 with regard to connection hole 31.

The application shown in FIG. 7*f* uses, as does the application shown in FIG. 2*b*, a brace 186 injected during an injection molding process in the part in synthetic material of push shoe 187. Because push shoe 187, specifically its guiding unit 188, only maintains guiding contact with the guides of aluminum support 188, while push shoe 187 is made from a synthetic material, there is no need to use sleeve bearings in a synthetic material. The application shown in FIG. 7*g* is related to a push shoe 189 completely cast in aluminum. At the location of pushing surface 11, the push shoe 189 is provided with a rubber bush 190. Because at least the guiding unit 191 of push shoe 189 is completely made of metal, the use of sleeve bearings 192, 193 in synthetic material offers many benefits.

FIGS. 7*h* and 7*i* show that it is possible within the context of the invention to use an extruded aluminum profile for the center part 195 of push shoe 196, if seen in longitudinal direction 194. Indeed, the center part 195 has a constant cross-section, if seen in longitudinal direction 194, and is therefore highly indicated for such use. Parts 197, 198 of the push shoe 196, positioned at the external sides of center part 195, if seen from the longitudinal direction 194, are made as injection-molded synthetic parts connected (not shown) with center part 195.

As shown in FIGS. 7*j* and 7*k*, it is also possible to manufacture a push shoe 199 completely through the extrusion of aluminum. The push shoe 199 will then undergo a finishing mechanical process, such as sawing push shoe 199, to give the specific orientations to pushing surface 11 and sliding surface 13.

As shown by the wide range of applications of the invention, as described above, it is possible to further combine various aspects of the various applications to get a new application within the context of the invention.

What is claimed is:

1. A conveyor system comprising:
    a plurality of interlinked supports moveable over an infinite moving path and extending in a longitudinal direction transversely to a moving direction, each support having on a top side a mainly flat bearing surface extending between a front longitudinal top edge of each support and a back longitudinal top edge of each support, said bearing surface configured to carry products to be transported by the conveyor systems;
    plurality of push shoes, each push shoe supported by a respective one of said plurality of supports, each push shoe configured to move the products in a longitudinal direction with regard to the support, each push shoe including,
        a guiding unit extending under a level of the bearing surface to operate as a conducting means together with the respective support, said guiding unit including a contour part extending in a slanting downward direction from a first top longitudinal edge of the support, and
        a pushing unit configured to push the products in a sideward direction, said pushing unit extending above the level of the bearing surface and connected to the guiding unit,
    each shoe open at a side opposite from the oblique, downward extending contour part of the guiding unit.

2. The conveyor system based on claim 1 wherein the oblique, downward extending contour part of the guiding unit extends from the first top longitudinal edge in the direction of the adjacent support located at the side of the first top longitudinal edge.

3. The conveyor system based on claim 1 wherein adjacent push shoes partially overlap each other in a transverse direction, perpendicular to the moving direction and to the longitudinal direction.

4. The conveyor system based on claims 1 or 3 wherein adjacent supports partially overlap each other in a transverse direction, perpendicular to the moving direction and to the longitudinal direction.

5. The conveyor system based on claim 1 wherein the first top longitudinal edge corresponds to the front top longitudinal edge.

6. The conveyor system based on claim 5 wherein the pushing unit of each push shoe includes a frontal surface in the extension of the oblique, downward extending contour part of the guiding unit.

7. The conveyor system based on claim 1 wherein the support under the bearing surface includes at least one vertically operating guide configured to provide guiding support to the push shoe, thereby preventing any contact between the bottom side of the pushing unit and the bearing surface.

8. The conveyor system based on claim 7, wherein the support includes a vertically operating guide in, at least two different positions.

9. The conveyor system based on claim 7 wherein the support includes a vertically operating guide in at least two positions configured to deliver guiding support to parts of the push shoe located at both sides of the oblique, downward extending contour part of the guiding unit.

10. The conveyor system based on claim 1 wherein the support is under the bearing surface with at least two horizontally operating guides configured to guide and lock the push shoe with regard to the support.

11. The conveyor system based on claim 10 wherein the support is at both sides of the oblique, downward extending contour pan of the guiding unit with at least two horizontally operating guides configured to guide parts of the push shoe located at both sides of the oblique, downward extending contour part of the guiding unit.

12. The conveyor system based on claim 1 wherein a guiding groove in the bearing surface of the support is configured to guide interaction with a guiding edge of the push shoe extending within the guiding groove.

13. The conveyor system based on claim 12 wherein the guiding groove includes a vertically active guide extending under the bearing surface configured to deliver guiding support to the push shoe thereby preventing contact between the push shoe and the support's bearing surface.

14. The conveyor system based on claim 12 wherein the guiding groove includes a horizontally active guide extending under the bearing surface configured to guide and lock the push shoe with regard to the support.

15. The conveyor system based on claim 1 wherein the support includes two parallel support components with in between a vertically extending passage over the full height of the support configured to allow passage of a part of the push shoe.

16. The conveyor system based on claim 15 wherein the sides of the support components of the supports are oriented toward each other, each said including at least one vertically active guide configured to deliver guiding support to the push shoe thereby preventing contact between the push shoe and the support's bearing surface.

17. The conveyor system based on claim 15 wherein the sides of the support components of a support, are oriented toward each other, each side including at least one horizontally active guide configured to guide and lock the push shoe with regard to the support.

18. The conveyor system based on claim 15 wherein the width of the passage at the level of the bearing surface is narrower than at the position under the bearing surface.

19. The conveyor system based on claim 1 wherein the push shoe includes a metal connector configured to support the interconnection of the guiding unit and the pushing unit.

20. The conveyor system based on claim 19 wherein the metal connector is formed by a metal brace having ends extending both within the guiding unit and within the pushing unit.

21. The conveyor system based on claim 20 wherein the metal connector is an integral part of the guiding unit.

22. The conveyor system based on claim 21 wherein the guiding unit includes sleeve bearings configured to guide interaction with the related support.

23. The conveyor system based on claim 20 wherein the parts in synthetic material of the guiding unit and/or the pushing unit are connected to the metal connector.

24. The conveyor system based on claim 23 wherein one part in a synthetic material of the pushing unit is connected to a straight part of the metal connector extending parallel to the bearing surface.

25. The conveyor system based on claim 23 wherein the parts in synthetic material of the guiding unit and the pushing unit are one integral component in synthetic material.

26. The conveyor system based on claim 23 wherein the parts in synthetic material of the guiding unit and the pushing unit are connected to the metal connector by means of snap connections.

27. The conveyor system based on claim 23 wherein at least one of the parts in synthetic material of the guiding unit and the pushing unit are made in an injection-molding process, and the metal connector is injected during the injection-molding process in the at least one injection-molded part in a synthetic material.

28. The conveyor system based on claim 1 wherein the material of at least the guiding unit of the push shoe is at least substantially an aluminum alloy.

29. The conveyor system based on claim 28 wherein the material of at least one part of the pushing unit of the push shoe also is an aluminum alloy.

30. The conveyor system based on claim 29 wherein at least one contour part in a synthetic material of the pushing unit is attached to the part of the pushing unit of which the material is an aluminum alloy.

31. The conveyor system based on claim 28 wherein the material of the entire push shoe is at least substantially an aluminum alloy.

32. The conveyor system based on claim 31 wherein the entire push shoe is at least substantially a cast product.

33. The conveyor system based on claim 28 wherein the part of the pushing unit of which the material is an aluminum alloy is an extruded product.

34. The conveyor system based on claim 33 wherein the extruded part of the pushing unit undergoes a mechanical finishing process to create at least one contour part of the pushing unit.

35. A conveyor system comprising:
   a plurality of interlinked supports moveable over an infinite moving path and extending in a longitudinal direction transversely to a moving direction, each support having on a top side a mainly flat bearing surface extending between a front longitudinal top edge of each support and a back longitudinal top edge of each support, said bearing surface configured to carry products to be transported by the conveyor system;
   a plurality of push shoes, each push shoe supported by a respective one of said plurality of supports, each push shoe configured to move the products in a longitudinal direction with regard to the support, each push shoe including,
   a guiding unit extending under a level of the bearing surface to operate as a conducting means together with the respective support,
   a pushing unit configured to push the products in a sideward direction, said pushing unit extending above the level of the bearing surface and connected to the guiding unit, and
   at least one rolling body configured to rotate around an axis unit to rollingly contact the support, the axis unit directly attached to a part of the push shoe with in a synthetic material.

36. The conveyor system based on claim 35 wherein each said at least one rolling body is configured to rollingly contact said bearing surface of each respective support.

37. The conveyor system based on claim 36 further comprising:
   a sleeve bearing configured to allow the rolling unit to rotate around the axis unit.

38. The conveyor system based on claim 36 wherein the at least the one rolling unit is configured to have rolling contact with the support at two opposite sides.

39. The conveyor system based on claim 36 wherein the rotation axis extends perpendicularly to the bearing surface.

40. The conveyor system based on claim 36 wherein the at least the one rolling unit is configured to have rolling contact with the bearing surface.

41. The conveyor system based on claim 36 wherein the rotation axis extends in the moving direction.

42. The conveyor system based on claim 36 wherein both the guiding unit and the pushing unit each include at least one rolling unit.

43. The conveyor system based on claim 36 wherein the push shoes entirely enclose each respective support.

44. The conveyor system based on claim 36 wherein the axis unit comprises a synthetic material.

45. The conveyor system based on claim 44 wherein the axis unit is integrally formed with the synthetic material of the push shoe.

46. The conveyor system based on claim 36 wherein the axis unit is clamped in the part of the push shoe.

47. The conveyor system based on claim 46 wherein the axis unit is clamped in a round recess of the push shoe.

48. The conveyor system based on claim 46 wherein the axis unit is clamped at both sides of the respective rolling unit between two legs of a U-shaped recess, the legs extending perpendicularly in the axial direction of the axis unit.

49. The conveyor system based on claim 36 wherein the guiding unit further comprises:
   a contour part extending slanting and downward from a first top longitudinal edge of the support.

50. The conveyor system based on claim 49 wherein each push shoe is open at the side located across from an oblique, downward extending contour part of the guiding unit.

51. The conveyor system based on claim 36 wherein the push shoe further comprises:

two disconnectable main components, each main component does not completely enclose the support.

52. The conveyor system based on claim 51 wherein the main components are inter-hinged around a hinge shaft extending in a longitudinal direction.

53. A conveyor system element comprising:

at least one support, each support having on a top side a mainly flat bearing surface extending between a front longitudinal top edge of each support and a back longitudinal top edge of each support;

at least one push shoe, each push shoe supported by one of said at least one support, each push shoe including, a guiding unit extending under the level of the bearing surface, a pushing unit extending above the level of the bearing surface and connected to the guiding unit, and at least one rolling body configured to rotate around an axis unit to rollingly contact the bearing surface of the at least one support.

* * * * *